(12) United States Patent
Suh

(10) Patent No.: US 10,640,333 B2
(45) Date of Patent: *May 5, 2020

(54) EGG LIFTING DEVICE, AND ASSOCIATED SYSTEMS AND METHODS

(71) Applicant: Zoetis Services LLC, Parsippany, NJ (US)

(72) Inventor: William Dongwook Suh, Cary, NC (US)

(73) Assignee: Zoetis Services LLC, Parsippany, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/398,950

(22) Filed: Apr. 30, 2019

(65) Prior Publication Data

US 2019/0256326 A1      Aug. 22, 2019

Related U.S. Application Data

(63) Continuation of application No. 15/673,525, filed on Aug. 10, 2017, now Pat. No. 10,336,585, which is a (Continued)

(51) Int. Cl.
*B66C 1/44*         (2006.01)
*B65G 65/02*      (2006.01)
(Continued)

(52) U.S. Cl.
CPC .............. *B66C 1/44* (2013.01); *A01K 43/00* (2013.01); *A47J 29/06* (2013.01); *B65G 65/00* (2013.01); *B65G 65/02* (2013.01)

(58) Field of Classification Search
CPC .......... B66C 1/44; B65G 65/00; B65G 65/02; A01K 43/00; A47J 29/06
(Continued)

(56) References Cited

U.S. PATENT DOCUMENTS 1,464,967 A    8/1923  Beauregard
1,469,493 A   10/1923  Brown
(Continued)

FOREIGN PATENT DOCUMENTS

CA    2 923 977 A1    3/2015
EP      0351022 A1    1/1990
(Continued)

OTHER PUBLICATIONS

International Search Report and Written Opinion, International Application No. PCT/US2015/014754, dated Apr. 23, 2015.
(Continued)

*Primary Examiner* — Patrick J Maestri
*Assistant Examiner* — Joseph J. Sadlon
(74) *Attorney, Agent, or Firm* — Scott C. Mayhew

(57) ABSTRACT

An egg lifting device is provided. Such a device includes a body and a securing arrangement extending from the body. The securing arrangement is configured to engage and deflect about an egg such that the egg is seated within the securing arrangement for lifting thereof. A plurality of egg lifting devices is arranged on an egg removal system such that multiple eggs are capable of being removed from an egg flat. Associated systems and methods are also provided.

15 Claims, 20 Drawing Sheets

Related U.S. Application Data continuation of application No. 15/349,182, filed on Nov. 11, 2016, now Pat. No. 9,731,943, which is a continuation of application No. 14/614,932, filed on Feb. 5, 2015, now Pat. No. 9,522,808.

(60) Provisional application No. 62/094,301, filed on Dec. 19, 2014, provisional application No. 61/937,722, filed on Feb. 10, 2014.

(51) Int. Cl.
*B65G 65/00* (2006.01)
*A01K 43/00* (2006.01)
*A47J 29/06* (2006.01)

(58) Field of Classification Search
USPC .................................... 294/99.1; 414/811
See application file for complete search history.

(56) References Cited

U.S. PATENT DOCUMENTS

| | | | |
|---|---|---|---|
| 1,500,939 A | 7/1924 | Howell | |
| 1,573,332 A | 2/1926 | Smythe et al. | |
| 1,749,753 A | 3/1930 | Cauffield | |
| 1,995,619 A | 3/1935 | Minto | |
| 2,177,595 A | 10/1939 | Freed | |
| 2,531,955 A | 11/1950 | Toney | |
| 2,606,658 A * | 8/1952 | Powell | B07C 5/24 |
| | | | 209/513 |
| 2,666,665 A * | 1/1954 | Whitcher | A23B 5/065 |
| | | | 294/87.12 |
| 2,681,822 A | 6/1954 | Daniels | |
| 2,714,523 A | 8/1955 | Bliss | |
| 2,720,411 A | 10/1955 | Fletcher | |
| 2,749,697 A * | 6/1956 | Poche | A01D 11/00 |
| | | | 294/19.2 |
| 2,792,253 A | 5/1957 | Bliss | |
| 3,523,707 A | 8/1970 | Roth | |
| 3,637,249 A | 1/1972 | Kuhl et al. | |
| 3,741,368 A * | 6/1973 | Burkholder | B65B 23/06 |
| | | | 198/418.1 |
| 4,006,581 A | 2/1977 | Freeman | |
| 4,019,430 A | 4/1977 | Warren | |
| 4,159,696 A * | 7/1979 | Martin | A01K 31/165 |
| | | | 119/337 |
| 4,302,142 A | 11/1981 | Kuhl et al. | |
| 4,344,359 A * | 8/1982 | Frechou | A47J 43/145 |
| | | | 99/516 |
| 4,396,109 A | 8/1983 | Nambu | |
| 4,505,373 A | 3/1985 | Thomas | |
| 4,519,494 A | 5/1985 | McEvoy et al. | |
| 4,561,687 A | 12/1985 | Bostrom | |
| 4,569,444 A | 2/1986 | McEvoy et al. | |
| 4,681,063 A | 7/1987 | Hebrank | |
| 4,709,713 A | 12/1987 | Kuhl | |
| 4,722,106 A * | 2/1988 | Scegiel | A01K 55/00 |
| | | | 294/67.2 |
| 4,843,958 A | 7/1989 | Egosi | |
| 4,903,635 A | 2/1990 | Hebrank | |
| 4,928,628 A | 5/1990 | Gassman et al. | |
| 4,974,894 A * | 12/1990 | Dubow | A63B 47/02 |
| | | | 294/19.2 |
| 5,017,003 A | 5/1991 | Keromnes et al. | |
| 5,101,954 A | 4/1992 | Nambu | |
| 5,167,317 A | 12/1992 | van der Schoot et al. | |
| 5,325,768 A | 7/1994 | van den Hazel | |
| 5,527,550 A | 6/1996 | Miles et al. | |
| 5,898,488 A | 4/1999 | Kuhl | |
| 5,921,375 A * | 7/1999 | van Laar | B65G 47/848 |
| | | | 198/370.12 |
| 5,971,699 A * | 10/1999 | Winski | B65G 57/245 |
| | | | 414/791.6 |
| 6,000,526 A | 12/1999 | van Veldhuisen et al. | |
| 6,213,709 B1 | 4/2001 | Hebrank | |
| 6,343,688 B1 | 2/2002 | McKinlay | |
| 6,811,017 B1 | 11/2004 | Gross et al. | |
| 6,923,486 B1 * | 8/2005 | Slagman | B65B 35/36 |
| | | | 294/106 |
| 6,981,470 B2 | 1/2006 | Gross et al. | |
| 7,041,439 B2 | 5/2006 | Phelps et al. | |
| 7,261,860 B1 | 8/2007 | Vellinger et al. | |
| 7,503,279 B2 * | 3/2009 | Correa | A01K 45/007 |
| | | | 119/6.8 |
| 7,694,492 B2 * | 4/2010 | Van Ballegooijen | B65B 23/02 |
| | | | 53/257 |
| 7,958,843 B2 | 6/2011 | Correa et al. | |
| 8,096,404 B2 * | 1/2012 | Eschlbeck | B65G 1/1378 |
| | | | 198/429 |
| 8,399,247 B2 | 3/2013 | Phelps et al. | |
| 8,585,109 B2 * | 11/2013 | Chen | B25J 7/00 |
| | | | 294/86.4 |
| 9,239,321 B2 | 1/2016 | Robinson | |
| 9,332,738 B2 | 5/2016 | Hebrank et al. | |
| 9,521,831 B2 | 12/2016 | Suh et al. | |
| 9,522,808 B2 | 12/2016 | Suh | |
| 9,532,552 B2 | 1/2017 | Van De Zande | |
| 2003/0227613 A1 * | 12/2003 | Hebrank | C12N 7/00 |
| | | | 356/52 |
| 2004/0139989 A1 | 7/2004 | Ilich | |
| 2010/0292834 A1 | 11/2010 | Mirandola | |

FOREIGN PATENT DOCUMENTS

| | | |
|---|---|---|
| EP | 1118267 A1 | 7/2001 |
| EP | 1344728 A1 | 9/2003 |
| GB | 689173 A | 3/1953 |
| JP | 2011-169626 | 9/2011 |
| WO | WO 88/01924 A1 | 3/1988 |
| WO | WO 02/082890 A2 | 10/2002 |
| WO | WO 2013/152970 A2 | 10/2013 |
| WO | WO 2014/064727 A1 | 5/2014 |
| WO | WO 2015/037995 A1 | 3/2015 |
| WO | WO 2015/044547 A1 | 4/2015 |

OTHER PUBLICATIONS

Written Opinion of the International Preliminary Examining Authority, International Application No. PCT/US2015/014754, dated Jan. 26, 2016.

* cited by examiner

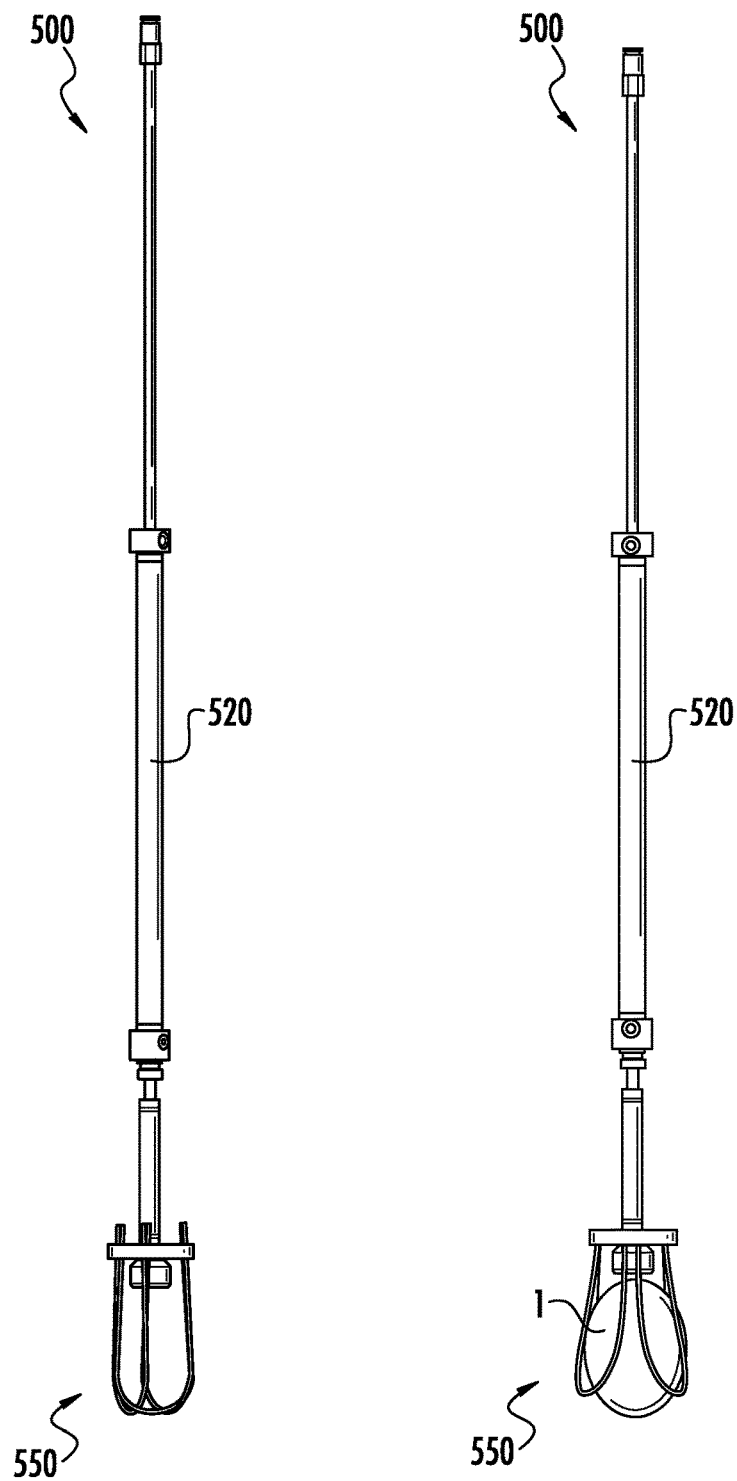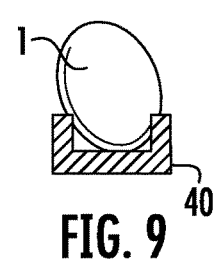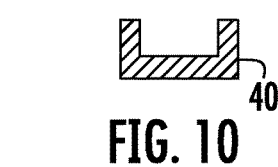
FIG. 9   FIG. 10

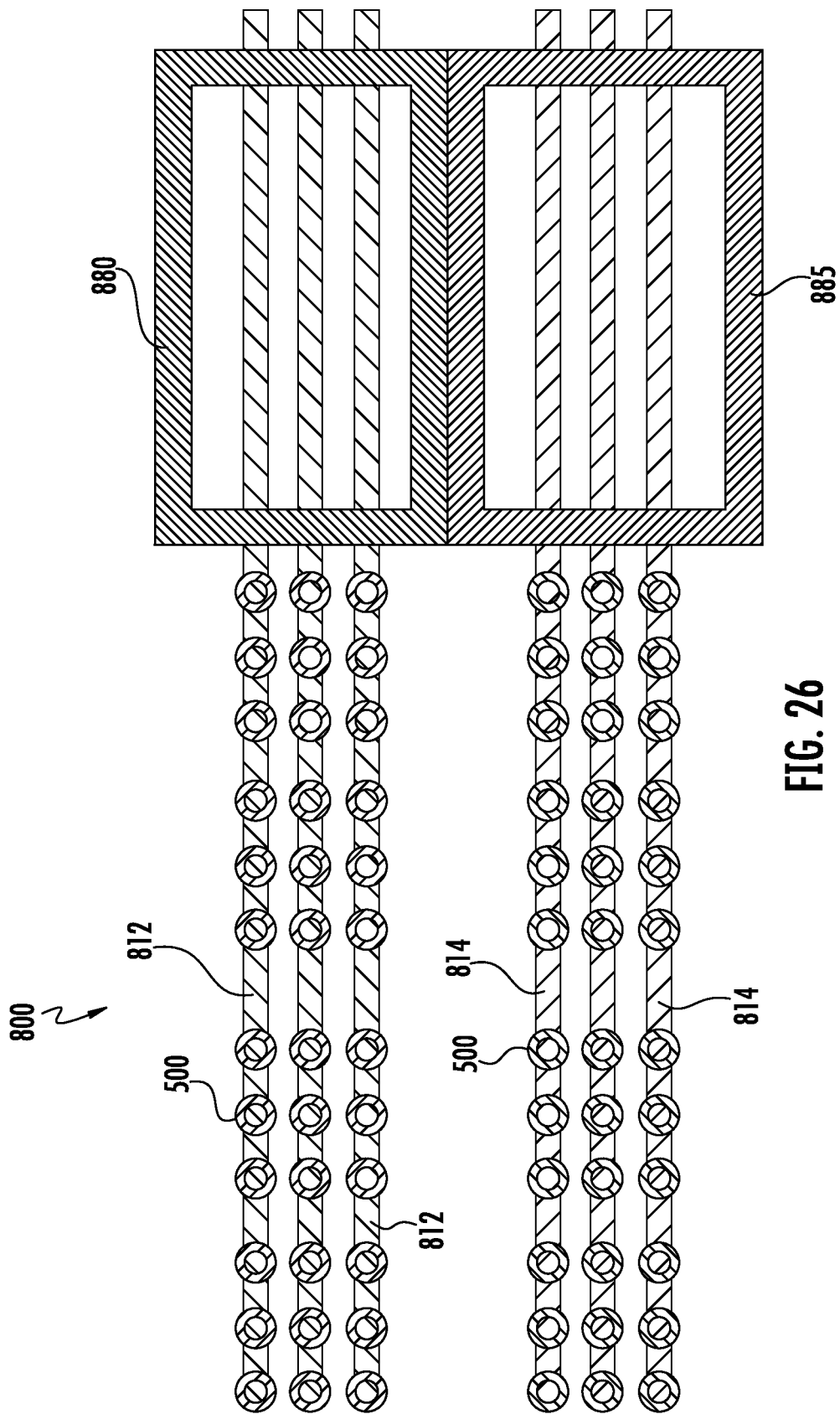

EGG LIFTING DEVICE, AND ASSOCIATED SYSTEMS AND METHODS

CROSS REFERENCE TO RELATED APPLICATIONS

This application is a continuation of U.S. application Ser. No. 15/673,525, filed Aug. 10, 2017, which is a continuation of U.S. application Ser. No. 15/349,182, now U.S. Pat. No. 9,731,943, filed Nov. 11, 2016, which is a continuation of U.S. application Ser. No. 14/614,932, now U.S. Pat. No. 9,522,808, filed Feb. 5, 2015, which claims the benefit under 35 U.S.C. § 119(e) of U.S. Provisional Patent Application Nos. 61/937,722, filed Feb. 10, 2014, and 62/094,301, filed Dec. 19, 2014, all of which are expressly incorporated herein by reference in their entirety.

TECHNICAL FIELD

The present disclosure generally relates to egg processing devices. More particularly, the present disclosure relates to an egg lifting device capable of lifting eggs contained within an egg flat or container, and associated systems and methods.

BACKGROUND

Various mechanical egg processing systems are used to process avian eggs within a poultry hatchery facility. Such mechanical egg processing systems may include, for example, a transfer system for transferring eggs from a tray associated with a setter incubator (commonly referred to as a "flat") to a container associated with a hatcher incubator (commonly referred to as a "hatching basket"). In other instances, an example of such mechanical egg processing systems may include an egg removal system for removing certain eggs from the flats. In the case of egg removal systems, it is common practice to remove non-live eggs from live eggs to increase available incubator space, to reduce the risk of contamination, and to save vaccine costs related to in ovo inoculations.

Conventionally, eggs designated as non-live are removed by hand or via an automated egg removal device. Automated egg removal devices may conventionally employ suction-type lifting devices as disclosed in U.S. Pat. No. 4,681,063 to Hebrank, U.S. Pat. No. 5,017,003 to Keromnes et al., or U.S. Pat. No. 7,083,208 to Ilich.

However, such suction-type lifting devices may typically employ vacuum systems that require additional mechanisms and power requirements to function. Furthermore, such suction-type lifting devices may be difficult to maintain and clean, particularly after engaging an egg that explodes due to bacterial build-up within the egg. Additionally, the polymer-based suction cup may become deformed about the lip area after continuous use, thereby affecting the suction and lifting ability of the lifting device. In addition, the suction-type lifting devices do not straighten eggs oriented at an angle in the egg flat.

Accordingly, it would be desirable to provide an egg lifting device and associated system capable of lifting eggs in a simplified manner while also improving the ease of maintenance of such a device, and further providing the additional function of straightening eggs oriented off-axis. Furthermore, it would be desirable to provide an associated method that would simplify and facilitate improved lifting of eggs.

BRIEF SUMMARY

The above and other needs are met by aspects of the present disclosure which, according to one aspect, provides an egg lifting device having a body and a securing arrangement extending from the body. The securing arrangement is configured to engage and deflect about an egg such that the egg is seated within the securing arrangement for lifting thereof. According to one aspect, the securing arrangement includes a plurality of resilient members cooperating to form an open-ended arrangement through which the egg is capable of being received.

Another aspect provides an egg removal system having a frame and a head operably engaged with the frame and configured to ascend and descend. A plurality of egg lifting devices is operably engaged with the head. Each egg lifting device has a securing arrangement configured to engage and deflect about an egg such that an egg is seated within the respective lifting device for lifting thereof. According to one aspect, each egg lifting device has a body with the securing arrangement extending therefrom.

Yet another aspect provides a method of removing eggs from an egg flat. The method comprises descending an egg lifting device to interact with an egg. The method further comprises contacting a securing arrangement of the egg lifting device with the egg. The method further comprises seating the egg within the securing arrangement by deflecting the securing arrangement about the egg. The method further comprises ascending the lifting device so as to lift the egg from an egg flat. According to one aspect, the method further comprises releasing the egg from the securing arrangement by actuating a release device.

Still another aspect provides an egg transport system having a track system with a drive assembly. The egg transport system further includes a plurality of egg lifting devices operably engaged with the drive assembly for moving the egg lifting devices along the track system. Each egg lifting device has a securing arrangement configured to engage and deflect about an egg such that an egg is seated within the respective lifting device for lifting and transporting thereof.

Thus, various aspects of the present disclosure provide advantages, as otherwise detailed herein.

BRIEF DESCRIPTION OF THE DRAWINGS

Figure 1:
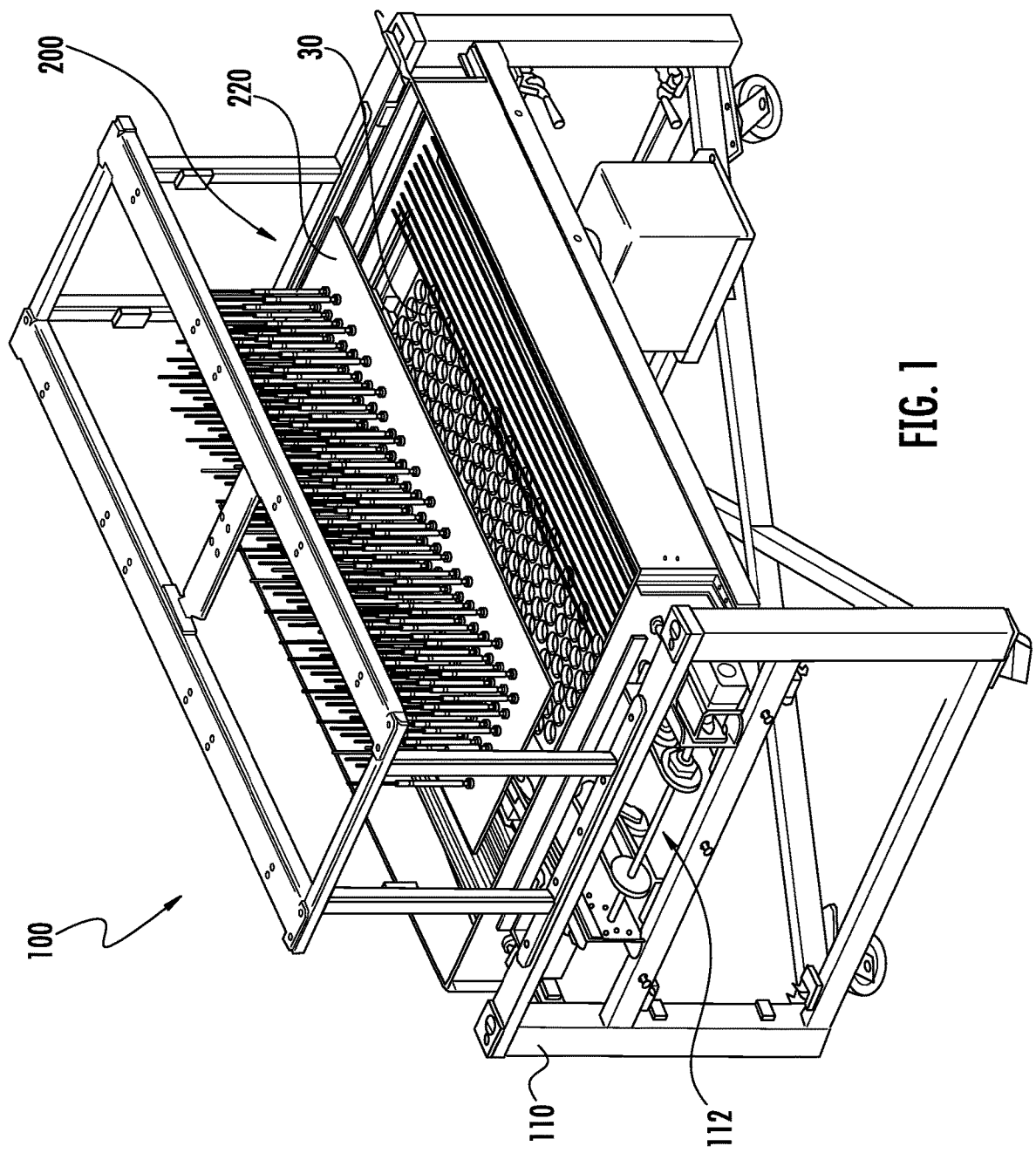
Figure 2:
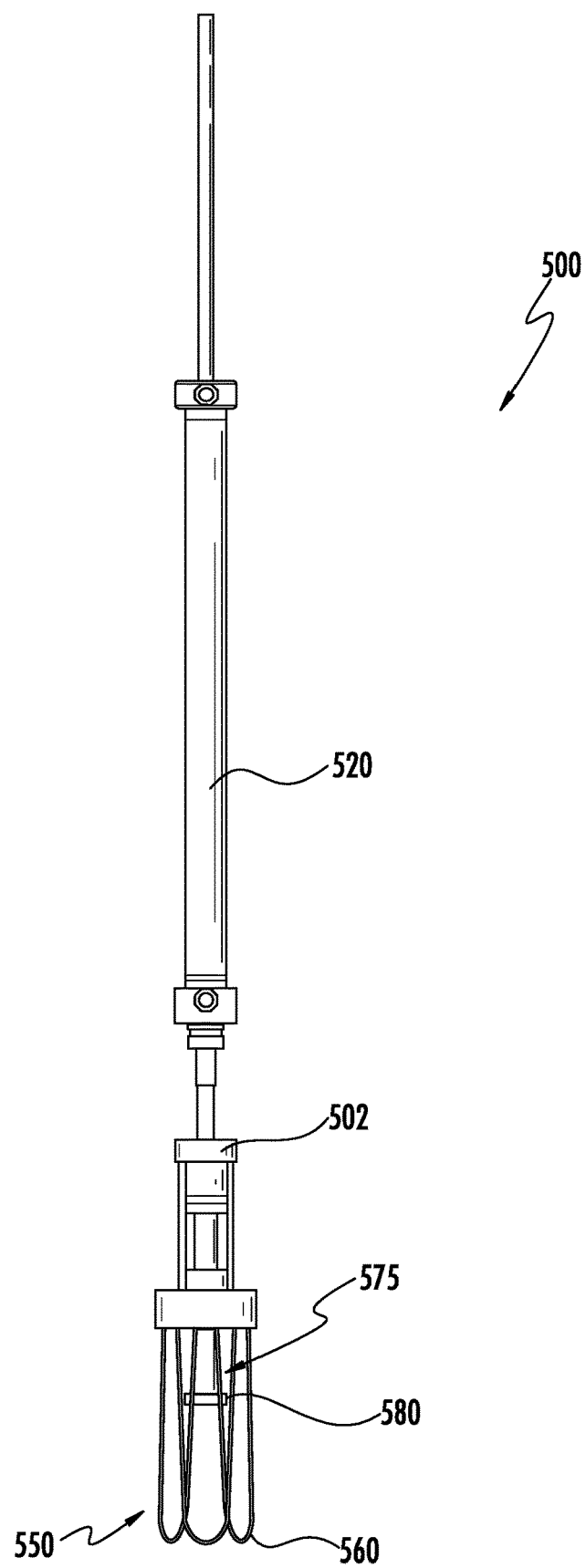
Figure 3:
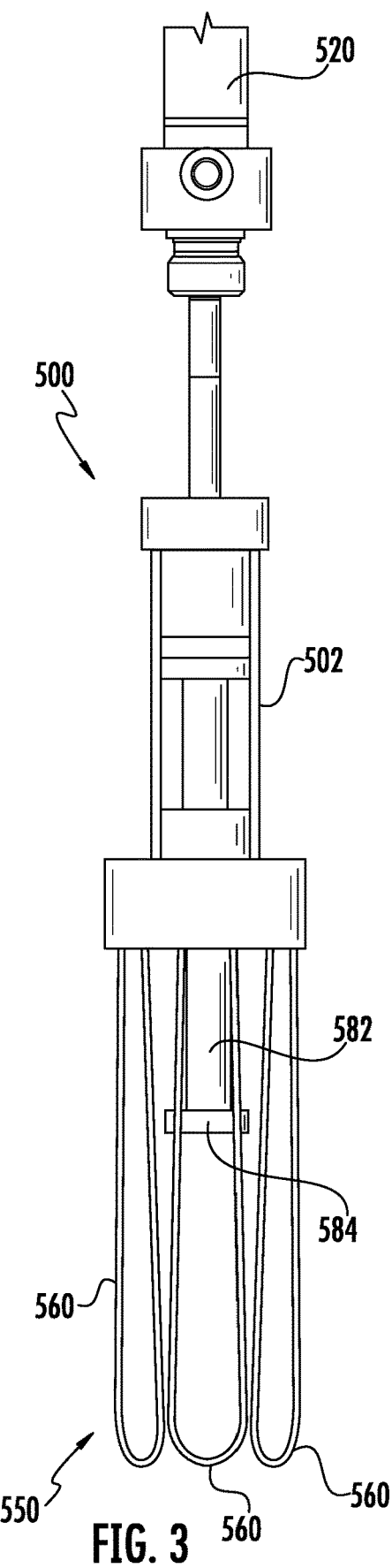
Figure 4:
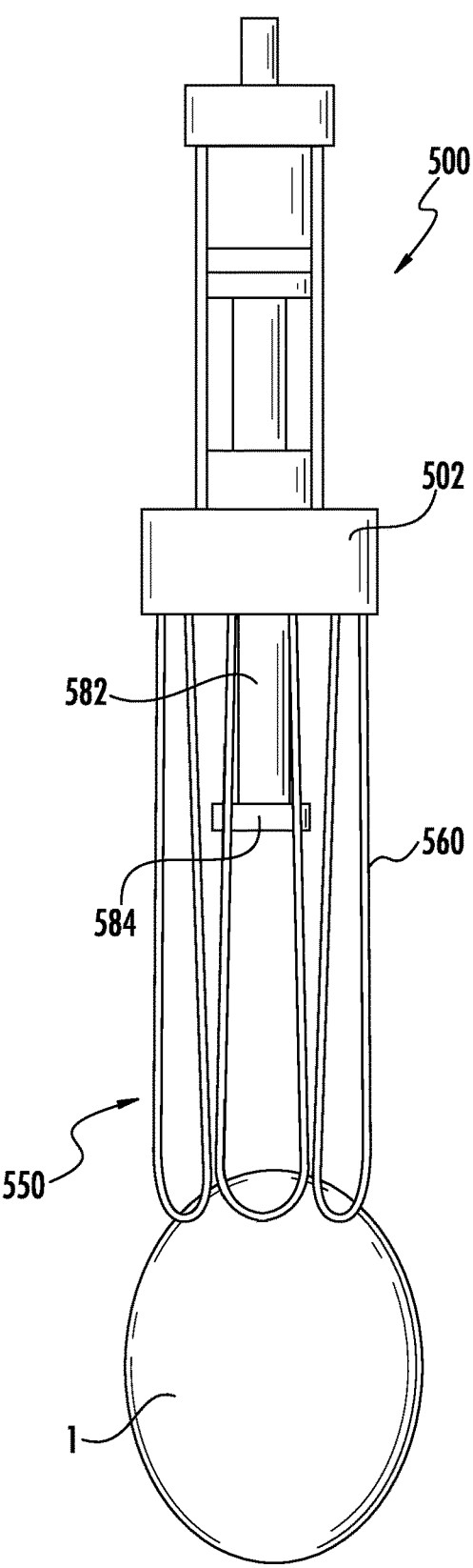
Figure 5:
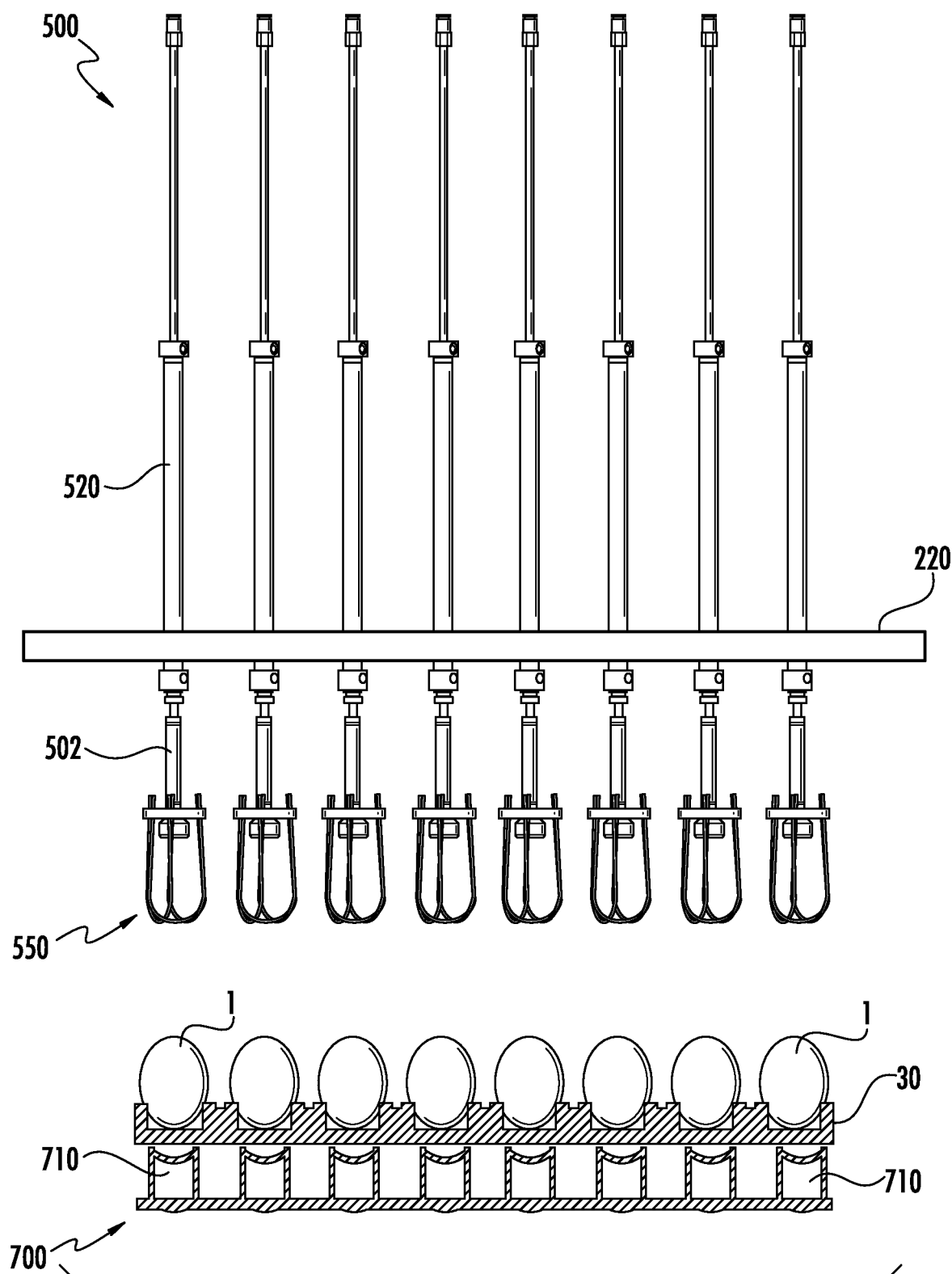
Figure 6:
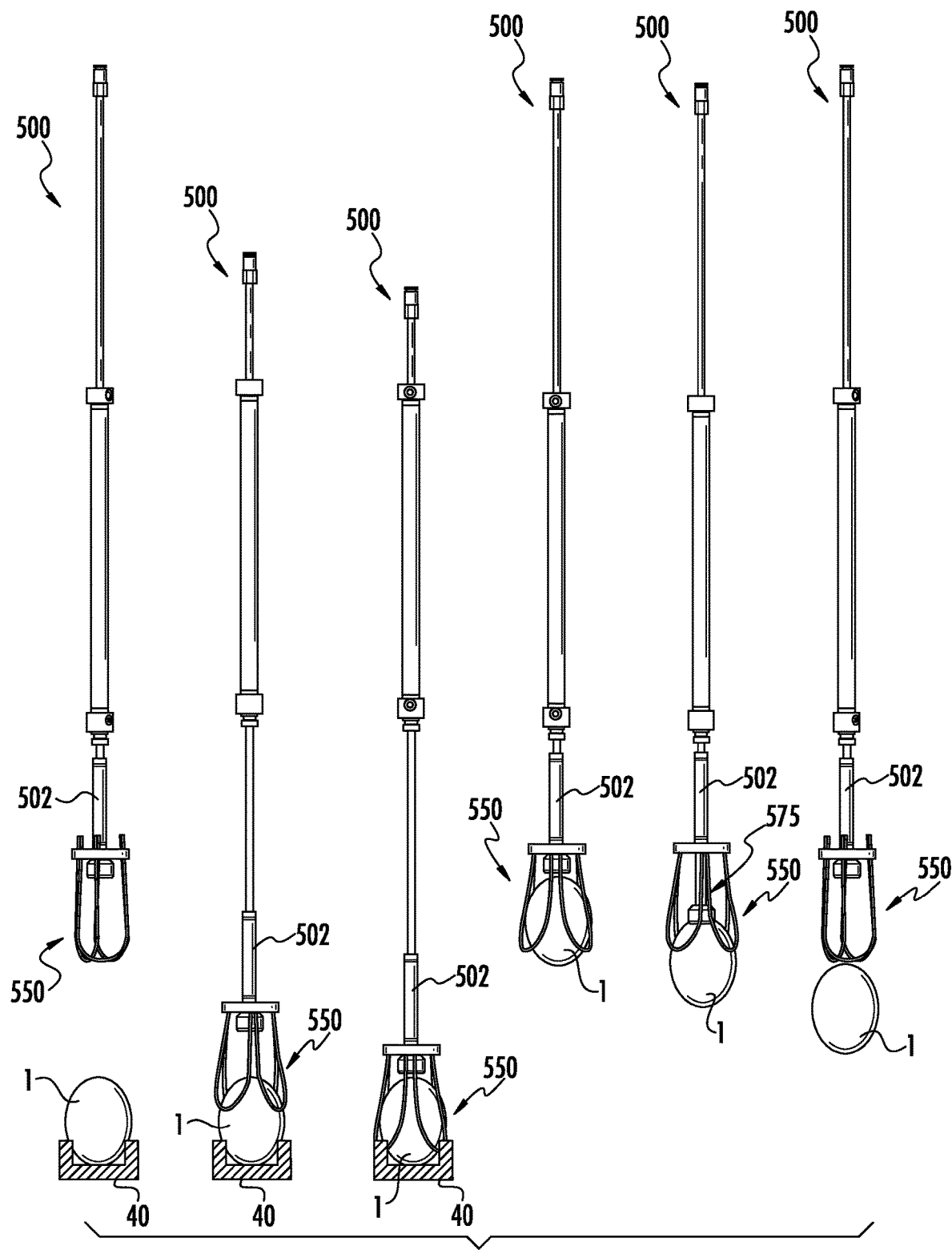
Figure 7:
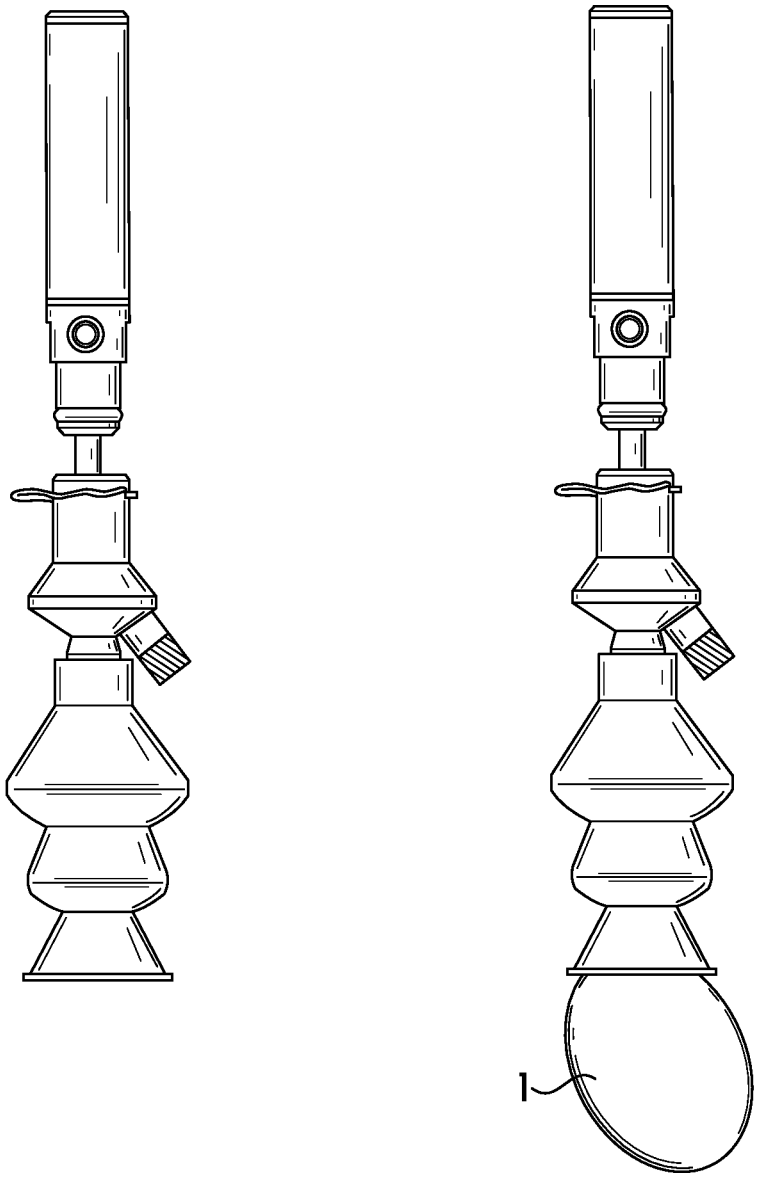
Figure 7:
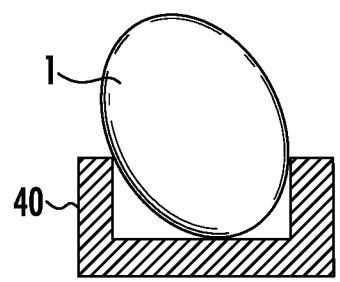
Figure 8:
Figure 11:
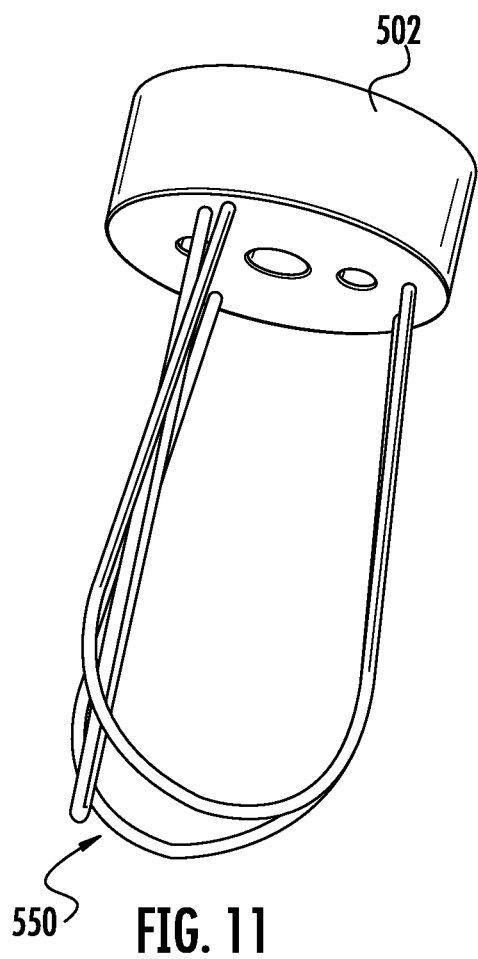
Figure 12:
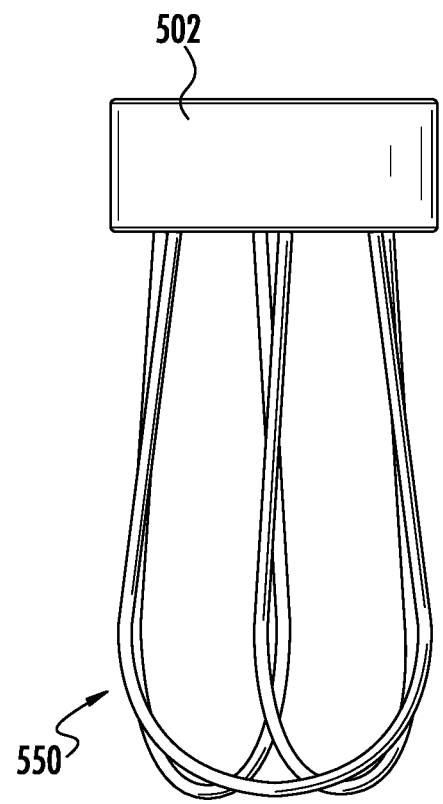
Figure 13:
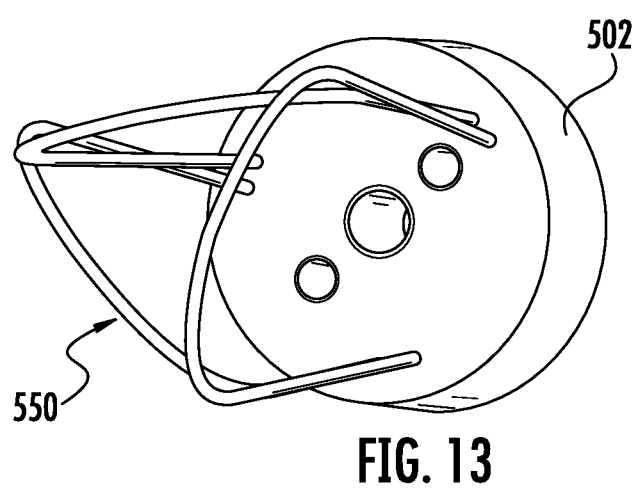
Figure 14:
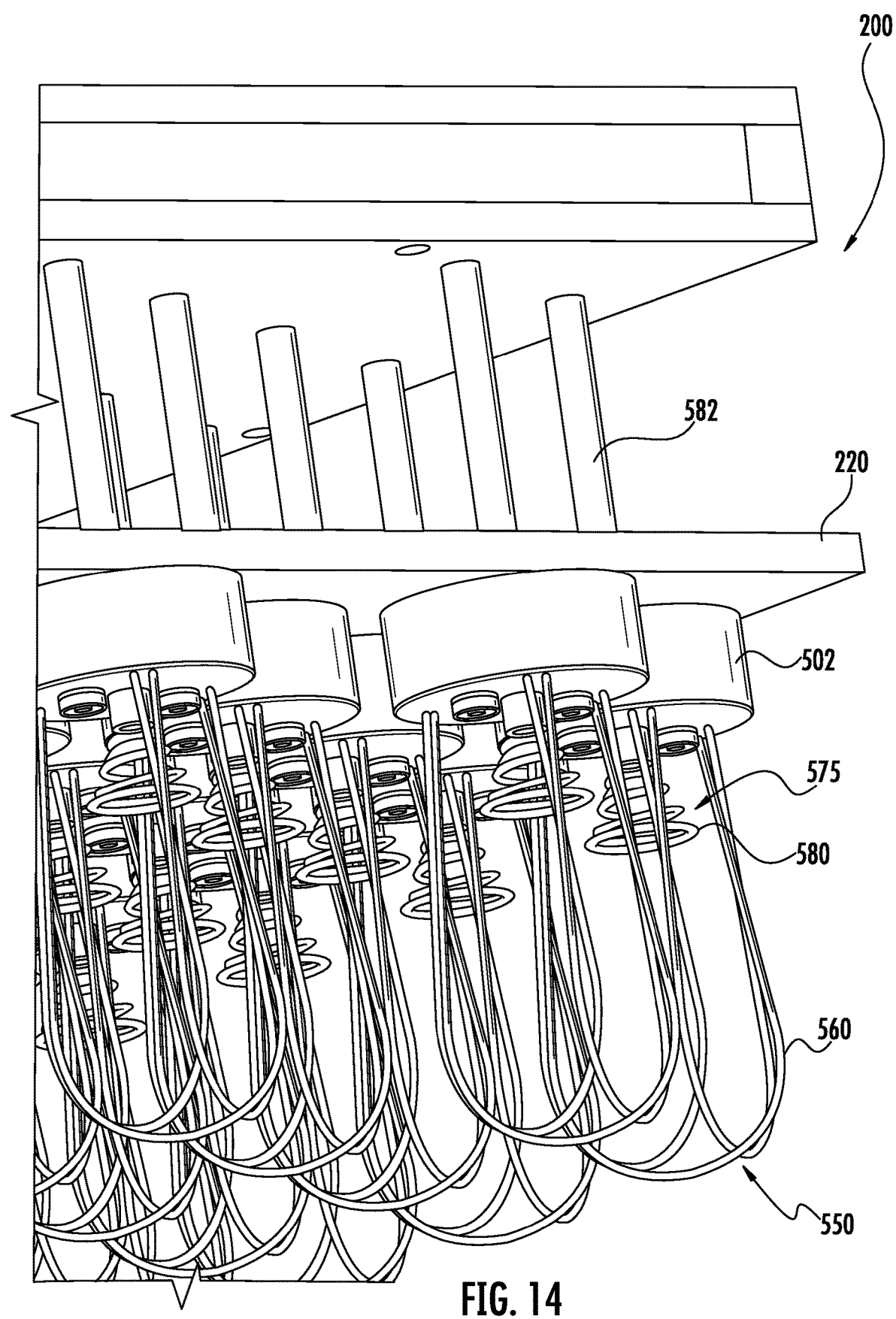
Figure 15:
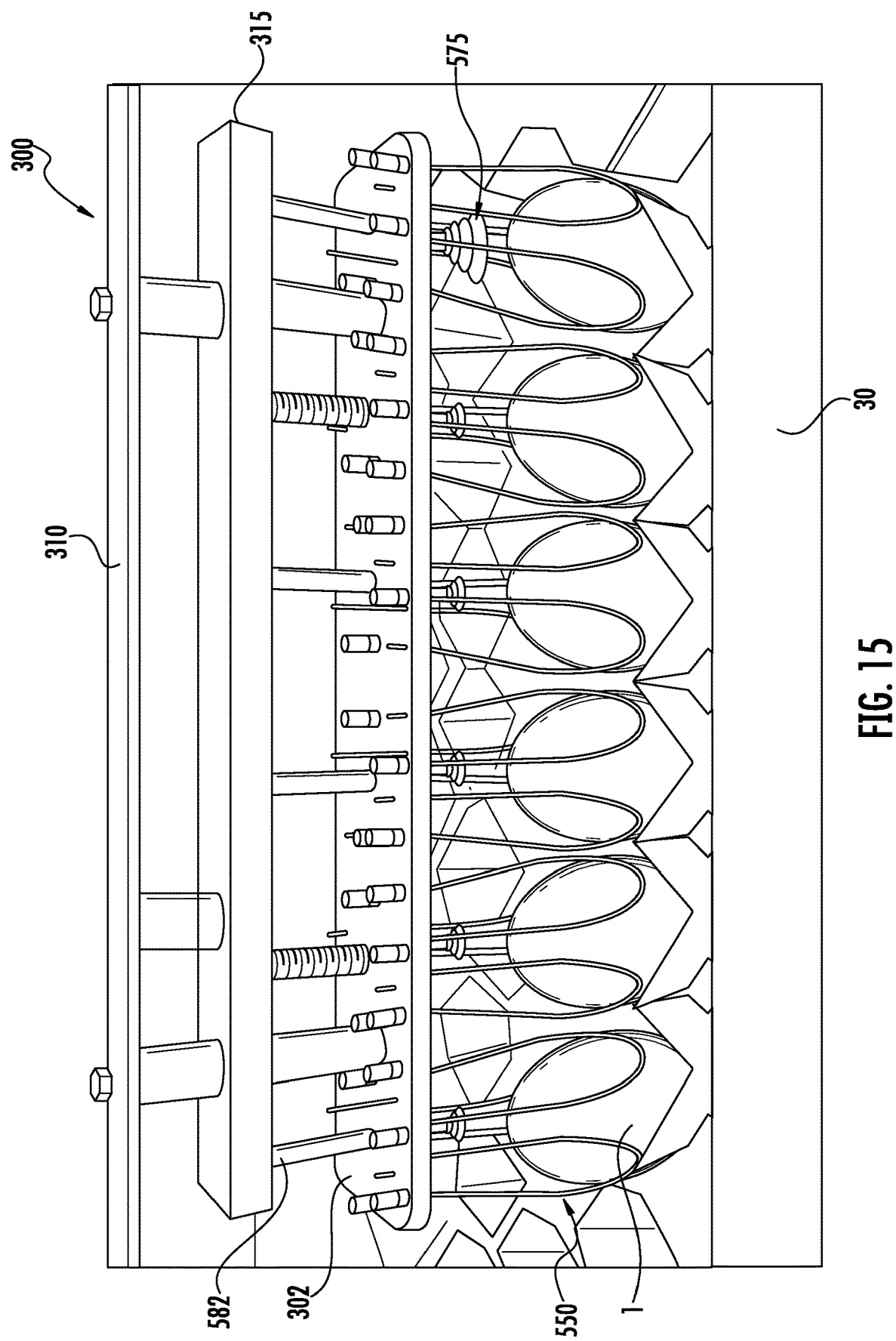
Figure 16:
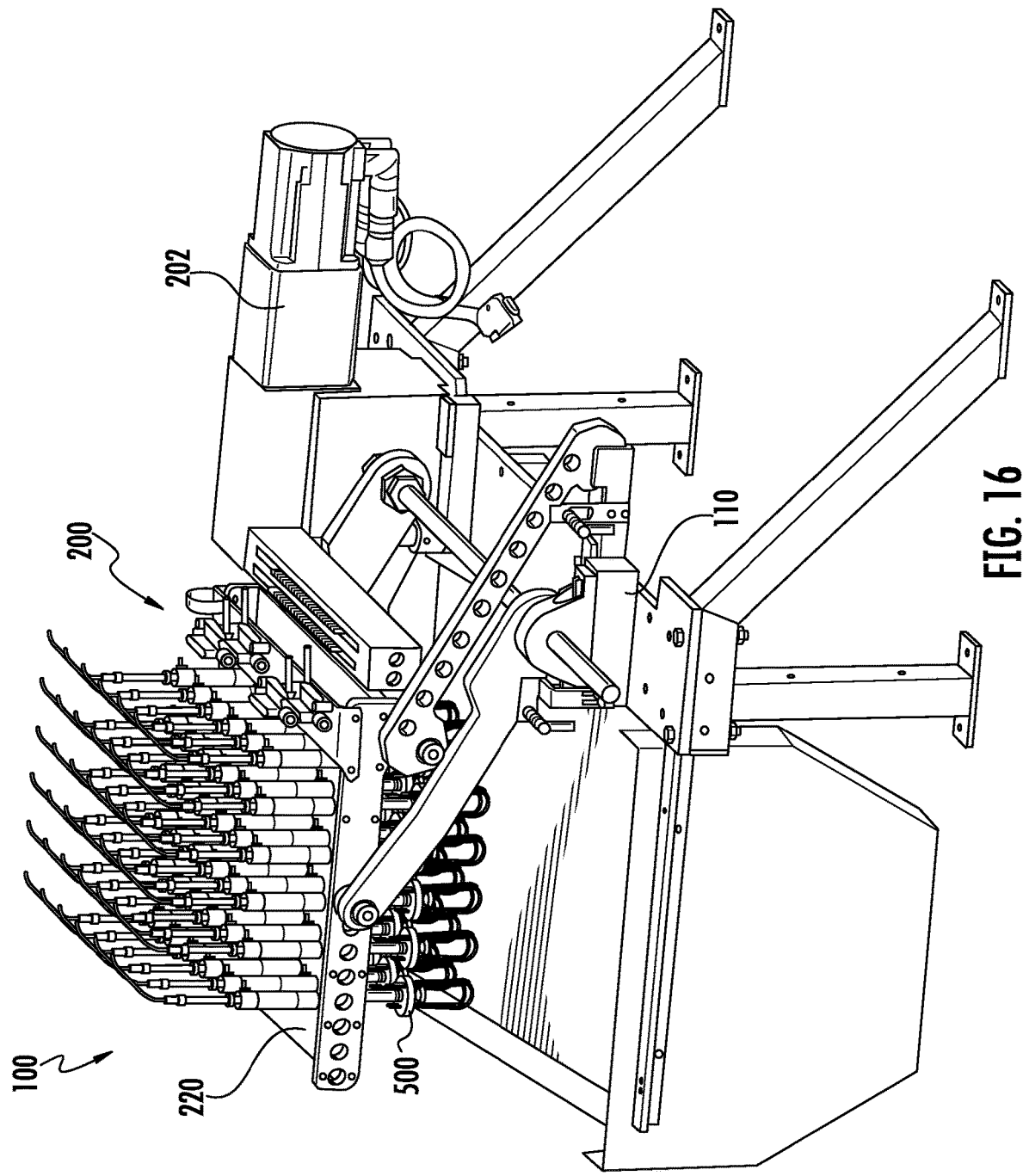
Figure 17:
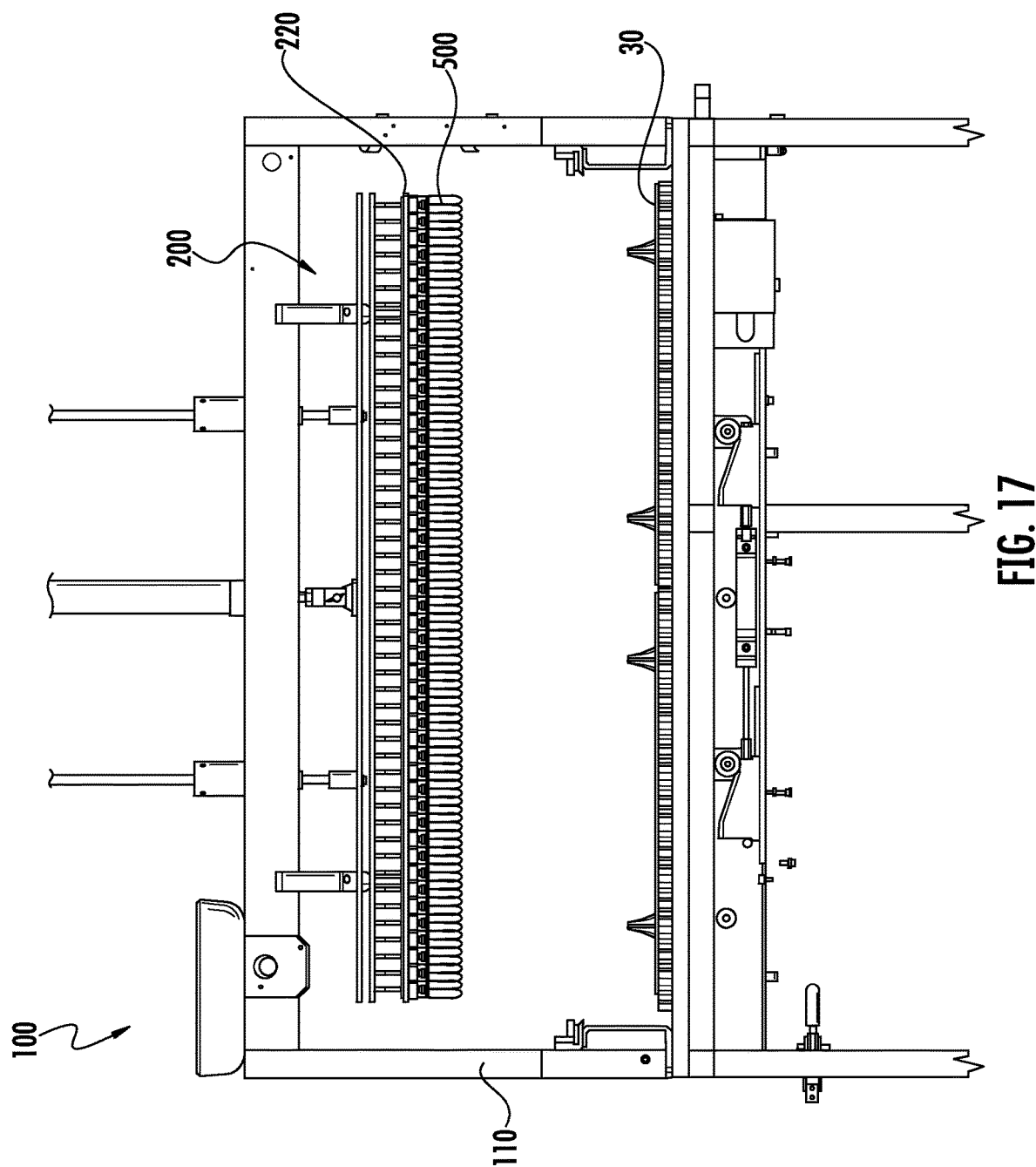
Figure 18:
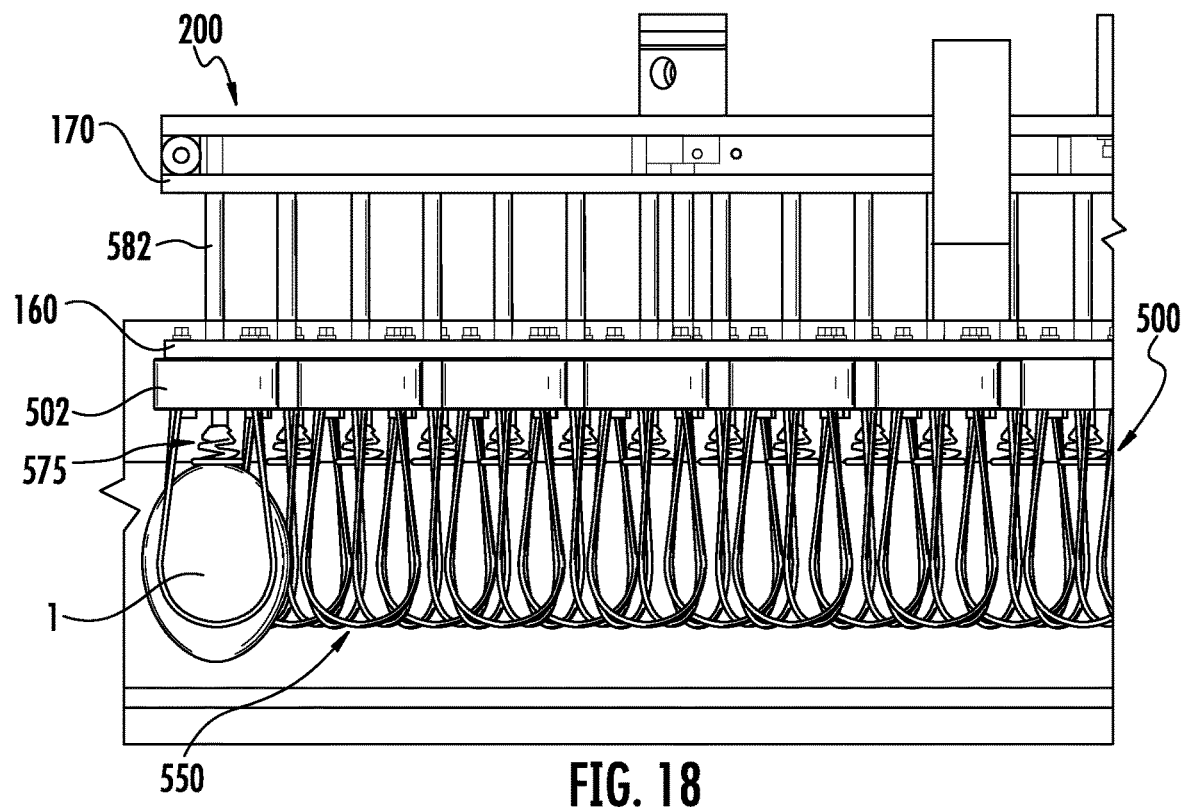
Figure 19:
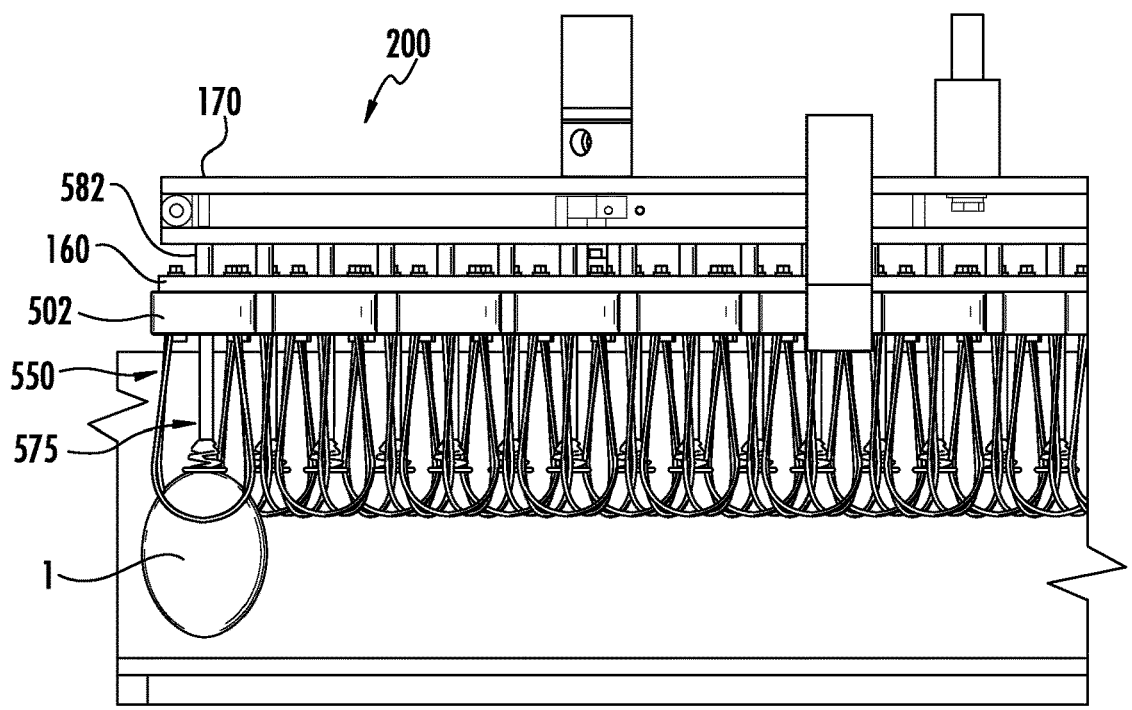
Figure 20:
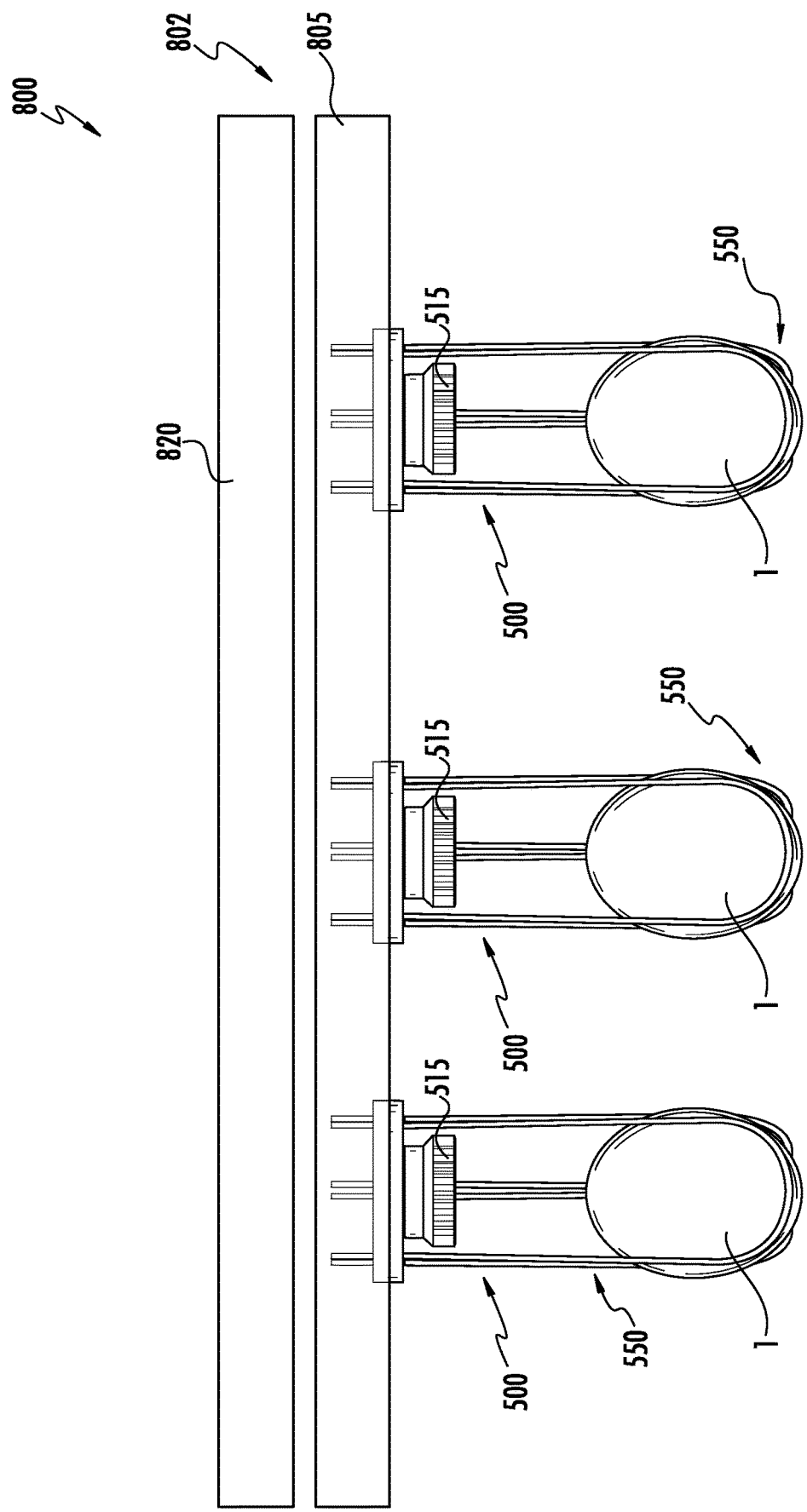
Figure 21:
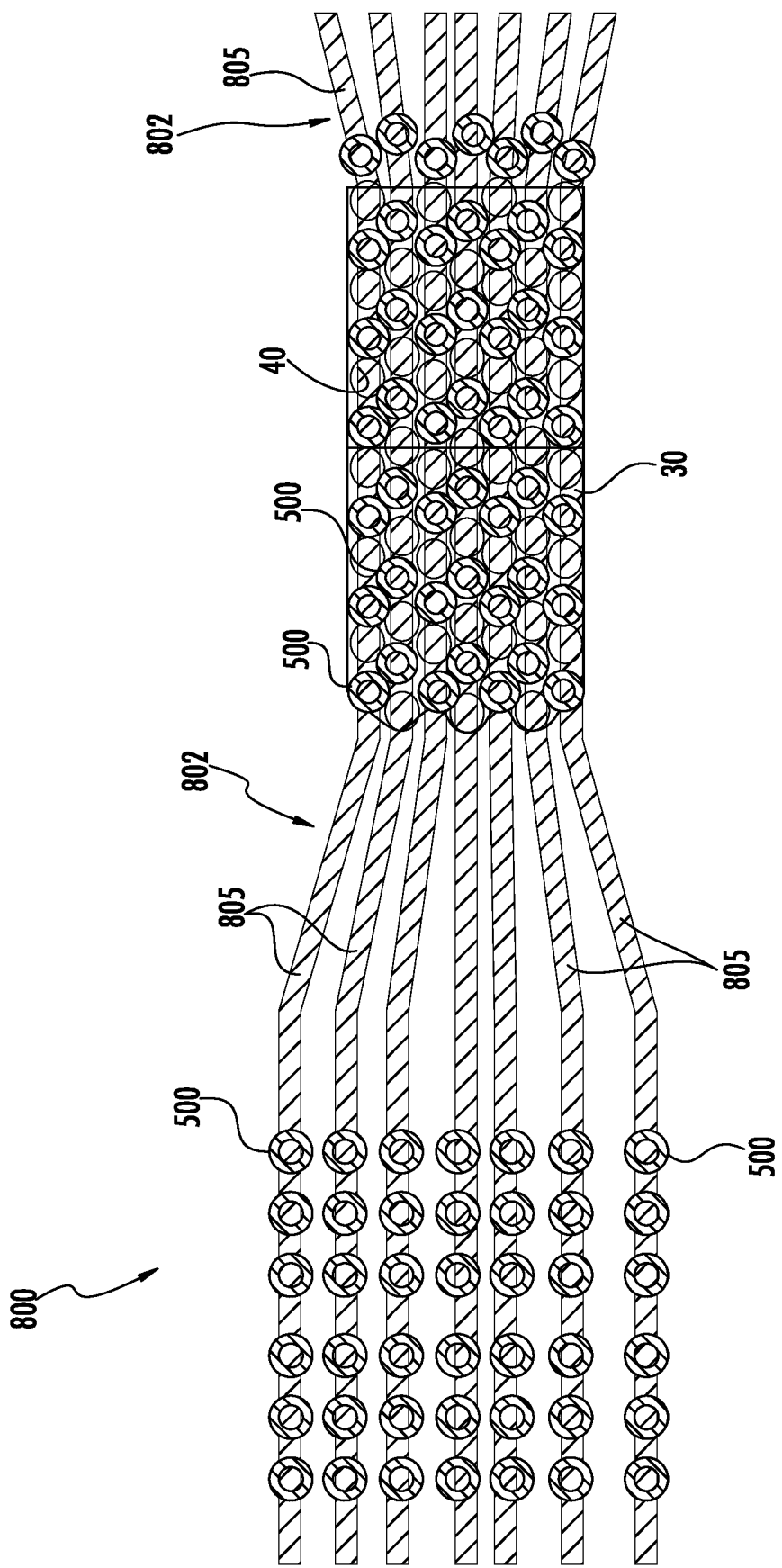
Figure 22:
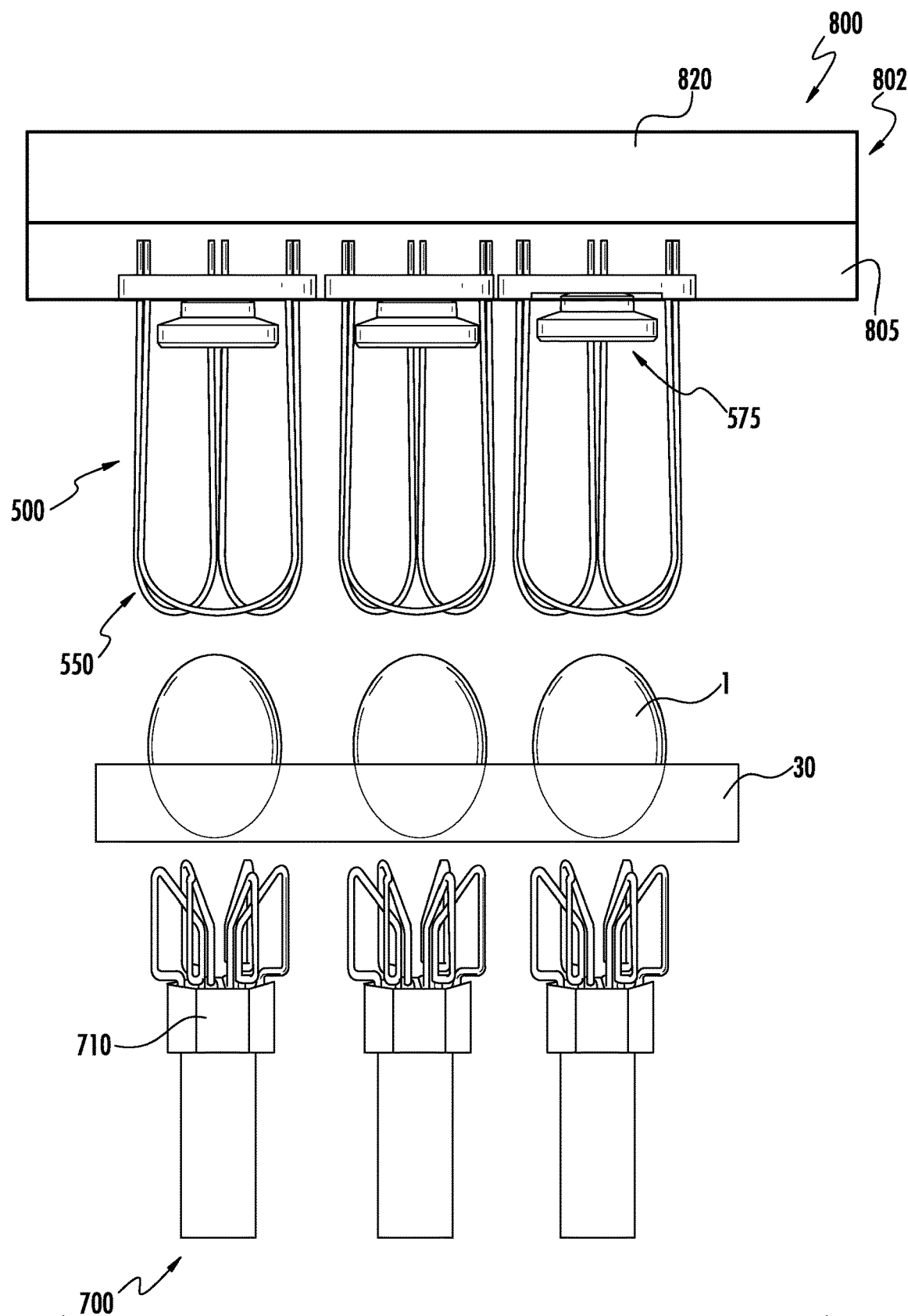
Figure 23:
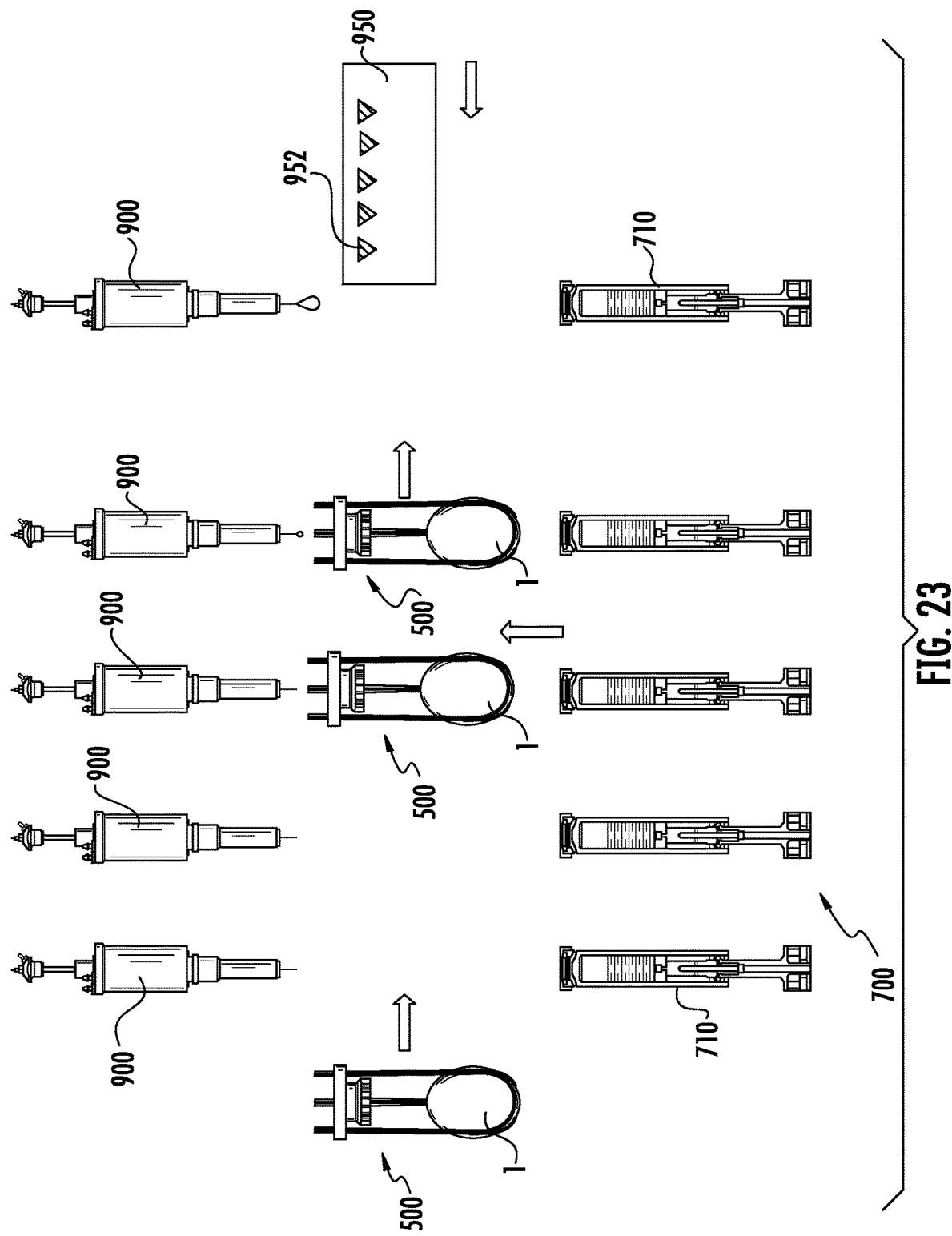
Figure 24:
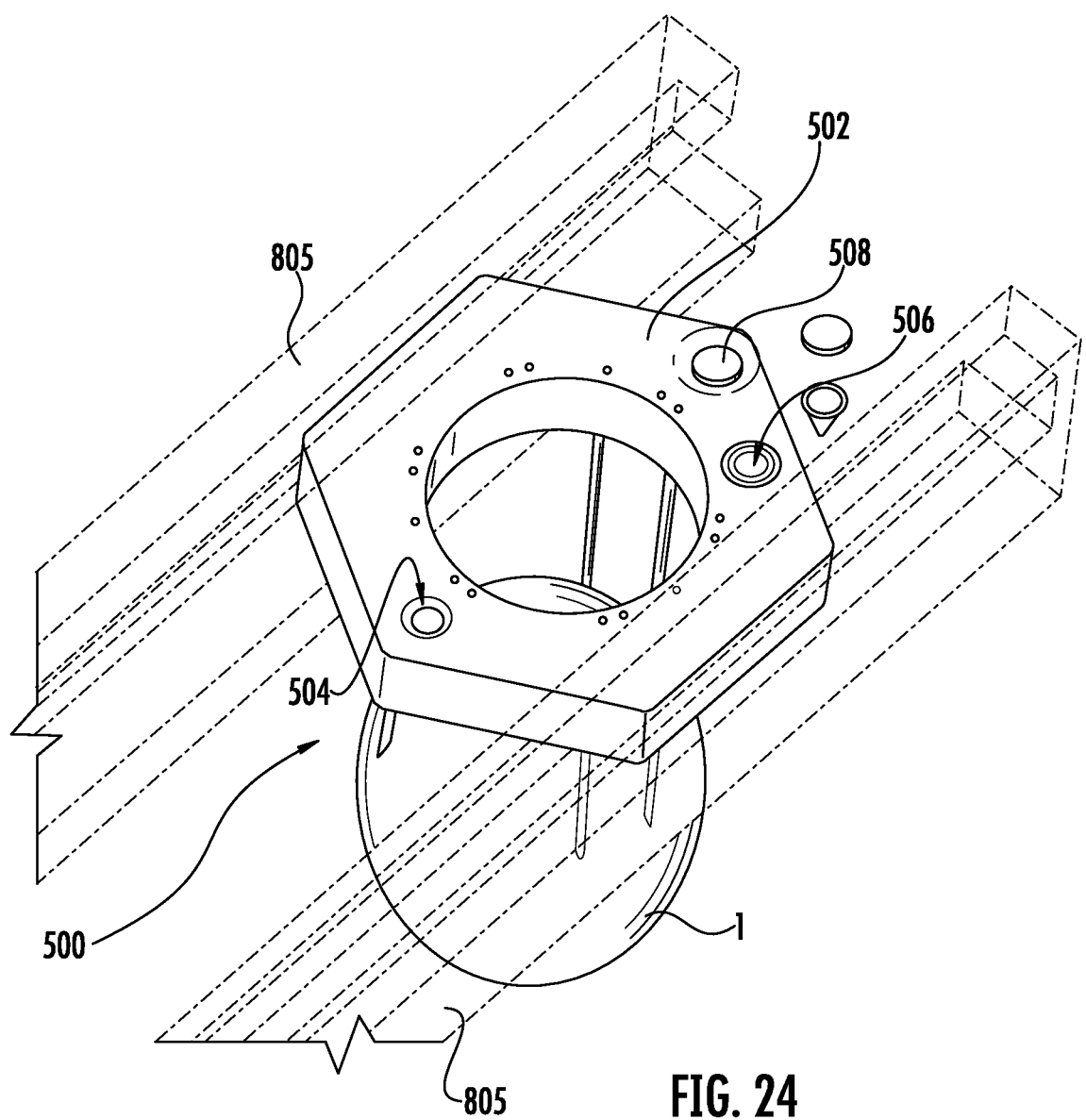
Figure 25:
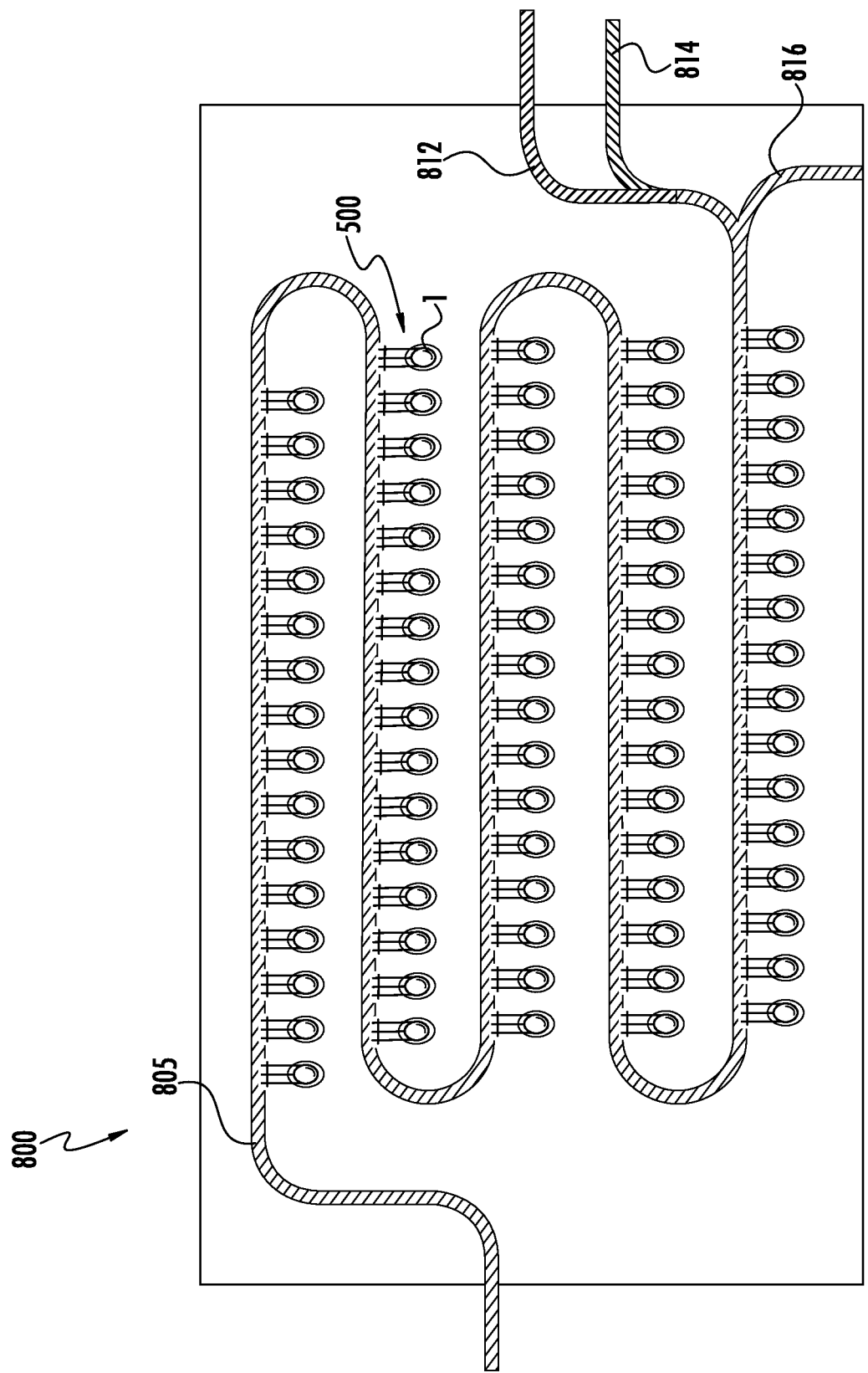

Having thus described various embodiments of the present disclosure in general terms, reference will now be made to the accompanying drawings, which are not necessarily drawn to scale, and wherein:

FIG. 1 is a perspective schematic view of an egg removal system capable of implementing a plurality of egg lifting devices, according to one aspect of the present disclosure;

FIG. 2 is a front view of an egg lifting device, according to one aspect of the present disclosure;

FIG. 3 is a magnified view of a portion of an egg lifting device, according to one aspect of the present disclosure;

FIG. 4 is a magnified view of a portion of an egg lifting device engaging an egg, according to one aspect of the present disclosure FIG. 5 is a front view of a plurality of egg lifting devices in position to remove one or more eggs from an egg flat, according to one aspect of the present disclosure;

FIG. 6 illustrates an egg lifting/releasing sequence in which an egg lifting device removes an egg from an egg flat, according to one aspect of the present disclosure;

FIG. 7 is a front view of a prior art suction-type lifting device in position to remove an egg from an egg flat, wherein the egg is oriented off-axis;

FIG. 8 is a front view of the prior art suction-type lifting device in FIG. 7 after removing the egg from the egg flat;

FIG. 9 is a front view of an egg lifting device in position to remove an egg from an egg flat, according to one aspect of the present disclosure;

FIG. 10 is a front view of the egg lifting device in FIG. 9 after removing the egg from the egg flat;

FIGS. 11-13 are various schematic views of a securing arrangement for an egg lifting device, according to one aspect of the present disclosure;

FIG. 14 is a perspective schematic view of a head having a plurality of egg lifting devices, according to one aspect of the present disclosure;

FIG. 15 is a perspective view of a manual egg removal device having plurality of egg lifting devices for removing eggs from an egg flat, according to one aspect of the present disclosure;

FIG. 16 is a perspective schematic view of an egg removal system implementing a plurality of egg lifting devices, according to one aspect of the present disclosure;

FIG. 17 is a front view of an egg transfer system implementing a plurality of egg lifting devices, according to one aspect of the present disclosure;

FIG. 18 is a partial front view of an egg transfer system implementing a plurality of egg lifting devices, illustrating an egg in a secured position;

FIG. 19 is a partial front view of an egg transfer system implementing a plurality of egg lifting devices, illustrating an egg in a partially released position;

FIG. 20 is a front view of an egg transport system, according to one aspect of the present disclosure;

FIG. 21 is a schematic view of a multiple-lane track system of an egg transport system, according to one aspect of the present disclosure;

FIG. 22 is a front view of an egg transport system implemented in conjunction with an egg support assembly, according to one aspect of the present disclosure;

FIG. 23 illustrates an egg carried by an egg lifting device being positioned for interaction with an egg processing device, according to one aspect of the present disclosure;

FIG. 24 is a perspective schematic view of an egg transport system, wherein an egg lifting device coupled to a track system transports an egg, according to one aspect of the present disclosure;

FIG. 25 is a schematic view of an egg transport system capable of routing eggs along various tracks according to an identified characteristic thereof, according to one aspect of the present disclosure; and FIG. 26 is a schematic view of an egg transport system capable of sorting eggs according to gender, according to one aspect of the present disclosure.

DETAILED DESCRIPTION OF THE DISCLOSURE

Various aspects of the present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

The present disclosure is directed to devices, systems and methods for lifting eggs. According to some aspects, the present disclosure provides vacuum-less/suction-less means for lifting eggs. The terms vacuum-less/suction-less refer to the lack of vacuum or suction needed to interact with an egg in order to lift said egg. Instead, aspects of the present disclosure provide physical engagement means for securing and lifting an egg. Such vacuum-less/suction-less aspects of the present disclosure provide many advantages, including simplifying the means for lifting eggs, improving ease of maintenance, and improving reliability.

FIGS. 1, 16 and 17 illustrate automated egg processing systems. FIGS. 1 and 16 illustrate egg removal systems 100. According to the particular aspect shown in FIG. 1, the egg removal system 100 is capable of removing and/or transferring eggs. Aspects of the present disclosure, however, are not limited to the illustrated egg removal system 100 of FIG. 1. Aspects of the present disclosure may be implemented on any system or apparatus in which lifting of eggs is desired. For example, aspects of the present disclosure may be implemented on an egg transfer system (FIG. 17) used to transfer eggs from a setter incubator tray (a so-called "egg flat") to a hatch incubator tray (a so-called "hatching basket").

As shown in FIG. 1, the egg removal system 100 may be particularly adapted for removing eggs positioned within an egg flat 30 (FIG. 5), which includes a plurality of receptacles for individually receiving and maintaining eggs in a generally vertical orientation. Examples of suitable commercial flats include, but are not limited to, a "CHICKMASTER 54" flat, a "JAMESWAY 42" flat and a "JAMESWAY 84" flat (in each case, the number indicates the number of eggs carried by the flat). Using the egg removal system 100, all or selected eggs may be removed from the egg flat when positioned below an egg remover head 200.

According to some aspects, the egg removal system 100 may include a frame 110 and a conveyor assembly 112 provided to move egg flats in an automated manner through the egg removal system 100 to a removal position. The conveyor assembly 112 may include a guide rail system configured to receive and guide egg flats to the removal position. The conveyor assembly 112 may further include appropriate stop elements, sensors, belts, endless loops, motors, etc. for proper indexing and positioning of egg flats within the egg removal system 100. In some instances, egg flats may be manually advanced through the egg removal system 100.

Eggs entering the egg removal system 100 via egg flats may have varying classification characteristics. For example, egg flats may include eggs that are classifiable based on viability, pathogen content, genetic analysis, or combinations thereof. As such, eggs are passed through an egg classifier system to generate a classification for each egg contained in an egg flat. Such eggs may be classified as viable or non-viable (i.e., those eggs not containing a viable embryo according to the egg classifier system), wherein the non-viable eggs may be further sub-classified as, for example, infertile, rotten, or dead eggs. Exemplary egg classifier systems may be capable of classifying the eggs by using, for example, candling techniques (opacity, infrared, NIR, etc.), assaying techniques, or other known and suitable classification methods, processes, or techniques. After classification, the eggs may be removed accordingly from the egg flat using the egg removal system 100 according to the identified classification, such as, for example, removing non-viable eggs from the egg flat.

As shown in FIG. 1, the egg removal system 100 may include the egg remover head 200 coupled to the frame 110. As shown in FIG. 14, the egg remover head 200 may include a plurality of egg lifting devices 500 capable of selectively or non-selectively removing eggs from the egg flat 30. In some instances, the egg remover head 200 may include a stationary plate 220 to which the egg lifting devices 500 are secured, coupled, or otherwise engaged, as shown in FIG. 5. According to some aspects, the stationary plate 220 may define a plurality of holes for receiving the egg lifting devices 500. In some instances, the egg lifting devices 500 may be selectively or individually controlled. That is, the egg lifting devices 500 may be selectively deployed such that interaction thereof with respective eggs may be selectively controlled. For example, the egg lifting device 500 may be configured to selectively engaging respective eggs such that only those eggs identified as a first subset (e.g., as live or viable) of eggs are contacted for removal or transfer from the egg flat. In such instances, a second subset (e.g., non-live or non-viable) of eggs may remain in the egg flat for further processing without contact from any of the egg lifting devices 500.

According to some aspects, the conveyor assembly 112 may transport eggs stored in the egg flat past the egg classifier system so that each egg passes therethrough such that data (egg classification status) may be generated for each egg. The data collected by the egg classifier system may be provided to a controller for processing and storing data associated with each egg. The controller may then be capable of generating a selectable removal signal to send to the egg lifting devices 500 so that individual egg lifting devices 500 (or subsets of egg lifting devices 500) are separately and individually deployed at various positions according to the classification status for each egg based on the data collected by the egg classifier system.

In other instances, the egg processing apparatus 100 may include the egg remover head 200 coupled to the frame 110 and configured to move vertically for interacting with eggs contained within an egg flat 30 when in a removal position beneath the egg remover head 200. The egg remover head 200 may be pneumatically or electrically driven to move vertically for facilitating interaction with eggs in the egg flat. In some instances, the egg processing head 200 may be lowered and raised pneumatically using a transfer cylinder (not shown) in fluid communication with a pneumatic system, as known by those of skill in the art. In some instances, the egg remover head 200 may be capable of lateral or horizontal movement outside the conveyor assembly 112 and/or the removal position. In other instances, the egg remover head 200 may be capable of arcuate movement using, for example, a servo motor 202 (FIG. 16). In such instances where the egg remover head 200 is movable, the egg lifting devices 500 may be fixed to the egg remover head 200 such that the egg lifting devices 500 are not individually or separately deployed for engaging the eggs. Instead, all eggs in the egg flat would be engaged by the various egg lifting devices 500 moved by the egg remover head 200. However, when the egg lifting devices 500 are individually or selectively controlled, the egg remover head 200 may still be capable of movement for various reasons, including transporting the eggs removed from the egg flat to some other location.

Referring now to FIGS. 2-4, the egg removal system 100 may be configured to engage or contact eggs for removal thereof from the egg flat using an egg lifting device 500. According to some aspects, as also shown in FIGS. 11-13, the egg lifting device 500 may include a body 502 and a securing arrangement 550. In some instances, the securing arrangement 550 may extend from the body 502, wherein the body 502 acts as a stem from which the securing arrangement 500 projects. The body 502 may be of unitary construction with the securing arrangement 550, while in other instances the body 502 may be discrete from the securing arrangement 550.

The securing arrangement 550 may be configured to secure an egg to the egg lifting device 500 using physical contact and interaction such that the egg may be lifted or removed from the egg flat. In this regard, the securing arrangement 550 may act in a suction-less or vacuum-less manner for lifting eggs. The securing arrangement 550 may be capable of deflecting about the egg as the securing arrangement 550 advances or descends upon the egg such that the egg becomes seated within or otherwise secured to the securing arrangement. In this regard, the securing arrangement may be formed of deflecting means or deflective members capable of deflecting about the egg and along the contours thereof, wherein the egg may be secured within the securing arrangement without mechanical actuation of the deflecting means or deflective members to grasp the egg. In some instances, the securing arrangement 550 may be open-ended so as to facilitate deflection of the securing arrangement 550 about the egg.

The securing arrangement 550 may be of unitary construction, while in some instances it may be formed of discrete components cooperating to form the securing arrangement 550. According to some aspects, the securing arrangement 550 may be formed of a pliant, flexible or resilient material so as to allow the securing arrangement 550 to deflect about the egg when coming into contact therewith. In this manner, the securing arrangement 550 may remain in frictional contact with the egg at various points thereon in a resistive or interference fit manner that allows the egg to be lifted from the egg flat. The securing arrangement 550 may be constructed from various materials that exhibit such deflective, elastic, or resilient qualities, such as, for example, resilient materials, elastic materials, superelastic materials, and shape memory materials. In some instances, the securing arrangement may be constructed of metal (e.g., stainless steel or nitinol) or polymer components, or combinations thereof. Initial engagement with an egg may be based on the natural elasticity or memory tension of the securing arrangement 550. In this regard, after initial engagement with the egg, the securing arrangement 550 holds the egg, and therefore does not require constant mechanical tension to hold the egg.

The securing arrangement 550 may have various shapes, forms, or structures that permit the securing arrangement 550 to lift an egg using physical contact and engagement therewith as the means for lifting the egg. According to one particular aspect, the securing arrangement 550 may be formed from a plurality of resilient members 560 extending from the body 502. The resilient members 560 may cooperate to form an open-ended arrangement that allows an end of the egg to be easily received within the securing arrangement 550. In some instances, the resilient members 560 may be in the form of wire loops forming a pliant wire structure in which to seat or secure the egg. Regardless of the form the securing arrangement 550 takes, the egg lifting device 500 may be capable of lifting the egg from the egg flat by means of physical contact and without suction. In some instances, the various resilient members 560 may be integrally formed, while in other instances the resilient members 560 may be discrete components. The resilient members 560 may be capable of bending elastically to accommodate eggs of varying size. In this regards, the securing arrangement 550 may provide automatic and passive gripping means. The resilient members 560 may follow the contour of the egg to grip the egg as the resilient members are advanced on the egg.

According to some aspects, the egg lifting device 500 may include an actuator 520 capable of raising/ascending and lowering/descending the securing arrangement 550. In some instances, the actuator 520 may be a linear actuator such as, for example, a pneumatically controlled cylinder. In instances where the egg lifting devices 500 are selectively controlled, each actuator 520 may be capable of receiving a signal indicating the egg classification status of respective eggs in the egg flat 30 such that the actuators 520 may be selectively actuated, thereby facilitating engagement or contact of certain select egg lifting devices 500 with respective eggs. By selectively actuating the actuators 520, interaction of components of the egg lifting device 500 with non-live or otherwise undesirable eggs may be advantageously avoided.

According to some aspects, as shown in FIGS. 2-4, the egg lifting device 500 may include a release device 575 configured to release the egg from the egg lifting device 500. In some instances, the release device 575 may include a release member 580 capable of contacting the egg to force the egg out of engagement with the egg lifting device 500. The release member 580 may include a shaft or rod 582 and a flange 584, wherein the flange 584 contacts the egg for release. While the contact portion of the release device 575 is illustrated as a flange, it will be understood that the contact portion (i.e., the portion physically contacting the egg to apply force thereto) may be of various shapes, sizes and configurations, such as, for example, a spring 590 (FIG. 14). Further, the contact portion may be formed of resilient material that lessens the impact forces of the release device 575 against the egg. In some instances, the egg to be lifted may include a hole at the end thereof due to previous egg processing procedures (e.g., punching a hole in an egg with a needle or punch such that a treatment substance may be injected into the egg). As such, the contact portion of the release device 575 may be configured such that the contact points thereof against the egg may be outside the hole, such as, for example, in circumferential manner. Further, in order to prevent impact at or near the hole, the contact portion may have a concave surface facing the egg, wherein the outer rim of the contact portion contacts the egg to limit cracking thereof by limiting the forces applied at or near the hole.

In some instances, the release member 580 may be biased using a biasing member. A release actuator may be provided to actuate the release member 580 to push the egg from the securing arrangement 550. For example, the release member 580 may be spring loaded, which may be actuated by the release actuator. According to some aspects, the release actuator may be pneumatically operated. The force applied by the release device 575 on the egg causes the egg to move downward, thereby deflecting the resilient members 560 outwardly such that the egg may be released from the securing arrangement 550.

In some instances, the securing arrangement 550 may be constructed of shape-memory materials in which the release mechanism for releasing eggs from the egg lifting device 500 may be accomplished by providing an electrical current or a temperature change to the securing arrangement 550 such that the egg is released according to a memory release protocol.

In some instances, as shown in FIG. 5, an egg support assembly 700 may be provided for raising the eggs from the egg flat such that the securing arrangement 550 is capable of fully securing the eggs therein, without obstruction from the egg flat 30. The egg flat 30 may typically be open-ended such that each egg receptacle 40 includes a hole through which the egg may be raised from underneath. In this regard, the eggs may be raised from underneath the egg flat by the egg support assembly 700, while the egg lifting devices 500 lift and remove the eggs from above the egg flat. That is, the egg support assembly 700 may operate and be positioned beneath the egg flat, while the egg lifting devices 500 operate and are positioned above the egg flats. In this manner, the egg support assembly 700 provides support to the eggs such that the securing arrangement 550 may be advanced about the eggs for securing thereof. According to some aspects, the egg support assembly 700 may include a plurality of pedestals 710 for individually raising the eggs from each respective egg receptacle 40. In this manner, the eggs may be raised separately with respect to one another.

In operation, as shown in FIG. 5, an egg flat 30 containing eggs 1 may be conveyed to the removal position beneath the egg remover head 200. In some instances, the egg remover head 200 may be capable of processing multiple egg flats 30 at a time.

FIG. 6 illustrates an exemplary sequence for removing an egg 1 from a receptacle 40 of an egg flat 30 using an egg lifting device 500 and then releasing the egg 1 therefrom. As shown, the egg lifting device 500 begins at a fully raised, retracted or ascended position. The egg lifting device 500 may then advance or descend to engage the egg 1 at which point the securing arrangement 550 contacts the egg and begins to deflect. The securing arrangement 550 may be further advanced to a fully descended position until the egg 1 is fully seated therein or secured thereto for removal. The egg lifting device 500 may then be raised, retracted or otherwise ascended so as to remove the egg 1 from the receptacle 40. Thereafter, the release member 580 of the release device 575 may be actuated to contact the egg 1, thereby pushing the egg 1 out of engagement with the securing arrangement 550. The released egg 1 may then be captured or transported accordingly.

Furthermore, as shown in FIGS. 9 and 10, the egg lifting device 500 may advantageously facilitate straightening of eggs when received therein. That is, eggs oriented off-axis within the egg flat may be straightened due to the forces exerted on the egg by the securing arrangement 550 when engaging the egg. In contrast, as shown in FIGS. 7 and 8, prior art suction-type devices maintain the orientation of the egg as positioned within the egg flat. It may be desirable to straighten or vertically align eggs automatically using the egg lifting device 500 for further processing of such eggs. For example, the eggs may be returned to an egg flat for injection of the eggs with a treatment substance in which case it may be desirable to have the eggs vertically aligned along the longitudinal axis of the egg within the egg flat.

FIG. 15 illustrates a manual egg remover device 300. In this instance, the body 502 may be formed as a plate 302 in which the securing arrangements 500 are coupled thereto. The manual egg remover device 300 may have a handle 310 for an operator to hold the device 300. The release devices 575 may be coupled to a connector 315 configured to move toward and away from the plate 302 such that the release devices 575 may interact with the eggs 1 for releasing the eggs therefrom.

FIGS. 18 and 19 illustrate the manner in which an egg 1 may be gently released into a hatching basket positioned on an egg transfer system 100. As shown, a first plate 160 may be configured to move relative to a second plate 170 such that when the first plate 160 moves toward the second plate 170, the stationary release device 575 interacts with the egg 1 to push the egg 1 out of the securing arrangement 550. In this regard the head 200 may be lowered such that the egg 1 is slightly contacting or almost contacting the hatching basket, so as to limit the distance the egg 1 may travel to contact the hatching basket. Subsequently, the first plate 160, having the lifting devices 500 coupled thereto, may ascend proximate to the second plate 170. Accordingly, the stationary release device 575 may remain in a fixed position, thereby contacting the egg and forcing the egg 1 out of the securing arrangement 550 and into the hatching basket.

FIGS. 20-26 illustrate various aspects of an egg transport system 800 capable of implementing the egg lifting devices 500 along a track system 802. The egg transport system 800 may facilitate adaptable and/or customized processing to meet various egg processing needs. In this regard, the egg lifting devices 500 as adapted to the egg transport system 800 may perform any number of functions, including, for example, acting as conveyor, egg flat, egg removers, locators, or storage. To that end, the egg lifting devices 500 may remove typical design/process constraints caused by egg flat type and handling, thereby decreasing design complexity and associated cost. In some instances, each egg lifting device 500 may allow each egg to be picked up once from the egg flat in the beginning of processing and remain riding until the drop-off at the final destination, such as the hatching basket.

Still in some instances, the egg lifting devices 500 as implemented in the egg transport system 800 may be used to store or hold eggs in an incubator, whether a setter or hatcher incubator. In this regard, the egg transport system 800 may direct eggs within the incubators where the eggs remain in the egg lifting devices 500 and are stored for incubation. This may eliminate the need for carts/trolleys that are currently used to move egg flats/hatching baskets in and out of the incubators. Additionally, each egg may be carried by an egg lifting device 500 to a cooler room until moving to the incubators. The egg transport system 800 may be configured to allow for tilting of the eggs within the incubators. Further, the egg transport system 800 may be configured to circulate eggs within the incubators to assist with even heat distribution.

Once loaded onto the egg transport system 800, the eggs may be carried by the egg lifting devices 500 to various processing stations or modules, such as, for example, egg identification, egg removal, egg injection, egg sampling, egg holding, egg heating, egg cleaning or sanitizing, egg stacking, egg sorting, egg backfilling, egg arranging (according to egg flats), egg transfer, egg sealing, or any other egg processing.

In some instances, the egg lifting devices 500 may be capable of tilting the egg to present the egg for injection at a target site. For instance, the eggs may be tilted by the egg lifting devices 500 such that the air cell is presented for injection.

As shown in FIG. 20, each egg lifting device 500 may include a tracking identifier 515, such as a barcode or RFID tag for tracking each egg lifting device 500 and respective egg carried thereby. Such a feature may allow for manual intervention at any time on demand for a specific egg lifting device 500 and egg. Thus, each egg may be accurately tracked through the process and data related thereto collected along the way for data processing and analysis.

According to one aspect, as shown in FIG. 21, the egg transport system 800 may include the track system 802 having a plurality of tracks 805 forming a multiple-lane system. The tracks 805 may be varied or narrowed with respect to one another as needed for processing. For example, the tracks 805 may be narrowed to correspond with an egg flat 30 such that eggs may be removed from the egg flat 30. Additionally, the egg lifting devices 500 may be staggered with respect to one another across the tracks 805 so as to correspond with the egg receptacles 40 of the egg flat 30. As such, the egg transport system 800 may be easily adapted to remove eggs from any egg flat type.

FIG. 22 illustrates the use of an egg support assembly 700 to lift or raise the eggs 1 from the egg flat 30 such that the securing arrangements 550 are able to secure the eggs 1 thereto, as previously described herein.

According to some aspects, the egg transport system 800 may include a drive assembly 820 for moving the egg lifting devices 500 along the track system 802. Each egg lifting device 500 may be coupled to the drive assembly 820 to facilitate movement of the eggs throughout the egg transport system 800. The drive assembly 820 may include any actuators, means or mechanism for moving the egg lifting devices along the track system 802 and individual tracks 805 thereof. For example, the drive assembly 820 may include comprises any of a chain, belt, magnetic drive assembly, linear drive assembly or other drive functional means.

FIG. 23 illustrates a sampling process in which the egg lifting device 500 carries an egg 1 to a sampling station having a processing device 900 capable of extracting a sample from the egg 1. As shown, the egg 1 may be carried to the processing device 900, wherein the pedestal 710 of the egg support assembly 700 is moved to support the egg 1 during the sample extraction process. Subsequently, the processing device 900 extends within the egg lifting device 500 in a co-axial manner and pierces the egg so as to enter the egg for extracting a sample. With the sample extracted, the egg lifting device 500 may be transported away for further processing or holding. An assay plate/tray or sample receiving medium 950 may be moved beneath the processing device 900 to receive the sample, for example, in an assay well 952.

According to some aspects of the present disclosure, the egg lifting device 500 may include one or more sample receiving segments for receiving a sample from the egg 1 carried thereby, as shown in FIG. 24. For example, the body 502 may be engaged with the track 805, wherein the body 502 defines a receptacle 504 for receiving a sample. In some instances, a disposable well 506 may be provided. Still in other instances, a sample receiving medium 508, such as filter paper, may be provided on the egg lifting device 500 for receiving a sample from the egg 1 carried thereby. In this regard, rather than using multiple large assay trays, the egg lifting devices 500 may be used as an individual assay tray. To that end, the processing device 900 may extract a sample from the egg 1 and then deposit the sample onto the egg lifting device 500 such that each egg lifting device 500 carries a sample from the egg it holds. Thereafter, the egg lifting devices 500 may be moved to an assay station for assay processing steps (heating, de-nature, reagent dispense, etc.) and/or incubation. In this regard, no separate egg holding/assay station may be needed, and associated physical movement, control, and communication may be eliminated. In other instances, the sample carried by the egg lifting device 500 may be directly processed separately from the egg with respect to the assay, wherein, for example, a collimated lens is used to focus heat from a heat lamp onto each sample. Cooling of the sample may be implemented in a similar fashion directed toward the sample itself.

In some instances, the egg transport system 800 may be configured to sort eggs according to an identified characteristic determined for each egg. For example, each egg may be identified according to gender as being male, female, or unknown and sorted accordingly. As shown in FIG. 25, each track 805 may include a plurality of branches for directing eggs 1 along varying routes according to an identified characteristic such as gender. The tracking identifier 515 may be used to determine which branch each egg 1 should follow. That is, after the egg 1 is determined to have a characteristic it is tracked through the system 800 with such information. As shown in FIG. 25, the egg lifting devices 500 and respective eggs 1 may be routed to a first branch 812 for female-identified eggs, a second branch 814 for male-identified eggs, or a third branch 816 for unknown eggs (male/female not determined) for appropriate processing. As shown in FIG. 26, the first branch 812 of each track 805 may transport the female eggs to a first processing station 880 (e.g., egg injection station), while the second branch 814 of each track 805 may transport the male-identified eggs to a second processing station 885 (e.g., egg injection station). In some instances, unknown eggs may be re-routed through the system for additional analysis in determining the characteristic of interest.

Many modifications and other aspects of the present disclosure set forth herein will come to mind to one skilled in the art to which this disclosure pertains having the benefit of the teachings presented in the foregoing descriptions and the associated drawings. For example, the egg lifting device 500 may be adapted or modified to rotate so at to rotate the egg or otherwise orient at various angles with respect to vertical for achieving a desired purpose such as, for example, manipulating an air cell (air pocket) within the egg for injection or sampling purposes. Therefore, it is to be understood that the present disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An egg lifting device, comprising:
    a body; and
    a securing arrangement extending from the body, the securing arrangement being formed of a plurality of resilient deflective members which deflect about an egg and along the contours thereof as the securing arrangement descends onto the egg such that the egg is seated, without additional mechanical actuation of the resilient deflective members, within the securing arrangement, the securing arrangement being configured to vertically align eggs oriented off-axis due to the forces exerted on the egg by the securing arrangement when engaging the egg.

2. An egg lifting device according to claim 1, wherein the resilient deflective members are arranged and cooperate to form an open-ended arrangement through which the egg is capable of being received.

3. An egg lifting device according to claim 1, wherein the resilient deflective members are constructed from super-elastic materials or the like.

4. An egg lifting device according to claim 1, wherein the resilient deflective members are constructed from shape memory materials or the like.

5. An egg lifting device according to claim 1, wherein the resilient deflective members are constructed from nitinol or the like.

6. An egg lifting device according to claim 1, further comprising an actuator operably engaged with the body, the actuator being configured to linearly move the body and the securing arrangement extending therefrom.

7. An egg lifting device according to claim 1, wherein each resilient member comprises a continuous wire loop structure.

8. An egg removal system, comprising:
    a frame;
    a head operably engaged with the frame and configured to ascend and descend for interacting with a plurality of eggs; and
    a plurality of egg lifting devices operably engaged with the head, each egg lifting device having a securing arrangement formed of a plurality of resilient deflective members which deflect about an egg and along the contours thereof as the securing arrangement descends onto the egg such that the egg is seated, without additional mechanical actuation of the resilient deflective members, within the respective lifting device for grasping thereof, the securing arrangement being configured to vertically align eggs oriented off-axis due to the forces exerted on the egg by the securing arrangement when engaging the egg.

9. An egg removal system according to claim 8, wherein the resilient deflective members are arranged and cooperate to form an open-ended arrangement through which the egg is capable of being received.

10. An egg removal system according to claim 8, wherein the resilient deflective members are constructed from super-elastic materials or the like.

11. An egg removal system according to claim 8, wherein the resilient deflective members are constructed from shape memory materials or the like.

12. An egg removal system according to claim 8, wherein the resilient deflective members are constructed from nitinol or the like.

13. An egg removal system according to claim 8, further comprising an actuator operably engaged with the body, the actuator being configured to linearly move the body and the securing arrangement extending therefrom.

14. An egg removal system according to claim 8, wherein each resilient member comprises a continuous wire loop structure.

15. A method of grasping eggs, the method comprising:
    engaging an egg lifting device to interact with an egg by contacting a securing arrangement of the egg lifting device with the egg, the securing arrangement having a plurality of resilient deflective members; and
    seating the egg, without additional mechanical actuation of the resilient members, within the securing arrangement by deflecting the securing arrangement about the contours thereof as the securing arrangement engages the egg, the securing arrangement being configured to vertically align eggs oriented off-axis due to the forces exerted on the egg by the securing arrangement when engaging the egg.

* * * * *